United States Patent
Yeager et al.

(10) Patent No.: US 10,116,737 B2
(45) Date of Patent: *Oct. 30, 2018

(54) OPTIMIZED CONSISTENT REQUEST DISTRIBUTION FOR BALANCED LOAD DISTRIBUTION IN A CONTENT DELIVERY NETWORK

(71) Applicant: Verizon Digital Media Services Inc., Playa Vista, CA (US)

(72) Inventors: Donnevan Scott Yeager, Union, OR (US); Timothy W. Hartrick, Boulder, CO (US); Robert J. Peters, Santa Monica, CA (US)

(73) Assignee: Verizon Digital Media Services Inc., Los Angeles, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 15/014,904

(22) Filed: Feb. 3, 2016

(65) Prior Publication Data
US 2016/0164964 A1    Jun. 9, 2016

Related U.S. Application Data

(63) Continuation of application No. 13/737,145, filed on Jan. 9, 2013, now Pat. No. 9,277,005.

(51) Int. Cl.
*H04L 29/08* (2006.01)
*H04L 29/12* (2006.01)

(52) U.S. Cl.
CPC ...... *H04L 67/1014* (2013.01); *H04L 61/2528* (2013.01); *H04L 67/1008* (2013.01);
(Continued)

(58) Field of Classification Search
CPC ............. H04L 67/1014; H04L 67/1008; H04L 67/1023; H04L 67/2842; H04L 67/289; H04L 61/2528; H04L 29/12405
(Continued)

(56) References Cited

U.S. PATENT DOCUMENTS 6,377,991 B1 *  4/2002  Smith ................. H04L 67/1008
                                                      709/226
6,816,907 B1 * 11/2004  Mei ......................... H04L 29/06
                                                      709/225

(Continued)

*Primary Examiner* — David Lazaro
*Assistant Examiner* — Zi Ye
(74) *Attorney, Agent, or Firm* — Ansari Katiraei LLP; Arman Katiraei; Sadiq Ansari

(57) ABSTRACT

Some embodiments provide a proprietary 64-bit consistent distribution scheme that preserves the efficiencies of CARP while providing a significantly more balanced distribution of requests that is on par with schemes reliant on computationally expensive cryptographic hashes. The scheme performs hashing of requested URLs and identifiers of available servers over a 64-bit space while optimizing the hashing to remove computationally expensive operations. Some embodiments provide a variant of the scheme to provide a differentiated distribution on the basis of one or more differentiating factors. A first variant utilizes load factor values to adjust the resulting hashes and to produce a first distribution of differentiated content that varies from a second distribution of undifferentiated content. A second variant identifies requests for differentiated content from requests for undifferentiated content and utilizes a first scheme to distribute the differentiated content and a second altered scheme to distribute the undifferentiated content.

18 Claims, 12 Drawing Sheets

| | Total Requests to all servers in PoP | Min Requests to a server in Pop | Max Requests to a server in PoP | Median | Std. Dev. | Process Avg. Nsec. |
|---|---|---|---|---|---|---|
| PoP1 Content Type 1 | 788119 | 3048 | 11530 | 7752 | 1897 | 166.8 |
| PoP2 Content Type 1 | 301075 | 1141 | 4622 | 2976 | 772 | 115.8 |
| PoP1 Content Type 2 | 4331326 | 16821 | 72279 | 44544 | 12513 | 84.6 |
| PoP2 Content Type 2 | 4736322 | 18703 | 83297 | 46358 | 10652 | 87 |
| PoP1 Content Type 3 | 41052546 | 160599 | 761362 | 401280 | 113695 | 76 |
| PoP2 Content Type 3 | 43047725 | 210055 | 757413 | 420329 | 115038 | 76.5 |

(52) U.S. Cl.
CPC ........ *H04L 67/1023* (2013.01); *H04L 67/289* (2013.01); *H04L 67/2842* (2013.01); *H04L 29/12405* (2013.01)

(58) Field of Classification Search
USPC ......................................................... 709/226
See application file for complete search history.

(56) References Cited

U.S. PATENT DOCUMENTS

| | | | |
|---|---|---|---|
| 7,774,470 B1* | 8/2010 | Sanders | H04L 63/1483 709/219 |
| 8,914,517 B1* | 12/2014 | Shpilyuck | G06F 9/5083 709/224 |
| 2007/0124476 A1* | 5/2007 | Oesterreicher | H04L 67/1008 709/226 |
| 2010/0241761 A1* | 9/2010 | Lee | H04W 88/18 709/242 |
| 2012/0185298 A1* | 7/2012 | Abboa-Offei | G06Q 10/00 705/7.31 |
| 2014/0108671 A1* | 4/2014 | Watson | H04L 65/4084 709/231 |
| 2014/0280606 A1* | 9/2014 | Long | H04L 67/30 709/205 |

* cited by examiner

|  | Total Requests to all servers in PoP | Min Requests to a server in PoP | Max Requests to a server in PoP | Median | Std. Dev. | Process Avg. Nsec. |
|---|---|---|---|---|---|---|
| CARP - PoP1 Content Type 1 | 788119 | 3048 | 11530 | 7752 | 1897 | 166.8 |
| Invention - PoP1 Content Type 1 | 788119 | 7594 | 8236 | 7892 | 109 | 203 |
| CARP - PoP2 Content Type 1 | 301075 | 1141 | 4622 | 2976 | 772 | 115.8 |
| Invention - PoP2 Content Type 1 | 301075 | 2844 | 3117 | 3019 | 63 | 140 |
| PoP1 Content Type 2 | 4331326 | 16821 | 72279 | 44544 | 12513 | 84.6 |
| Invention - PoP1 Content Type 2 | 4331326 | 42100 | 44224 | 43332 | 436 | 100 |
| PoP2 Content Type 2 | 4736322 | 18703 | 83297 | 46358 | 10652 | 87 |
| Invention - PoP2 Content Type 2 | 4736322 | 46124 | 48832 | 47328 | 462 | 101 |
| PoP1 Content Type 3 | 41052546 | 160599 | 761362 | 401280 | 113695 | 76 |
| Invention - PoP1 Content Type 3 | 41052546 | 397581 | 418369 | 410637 | 2946 | 89.6 |
| PoP2 Content Type 3 | 43047725 | 210055 | 757413 | 420329 | 115038 | 76.5 |
| Invention - PoP2 Content Type 3 | 43047725 | 423025 | 439999 | 430615 | 2935 | 90 |

Figure 4

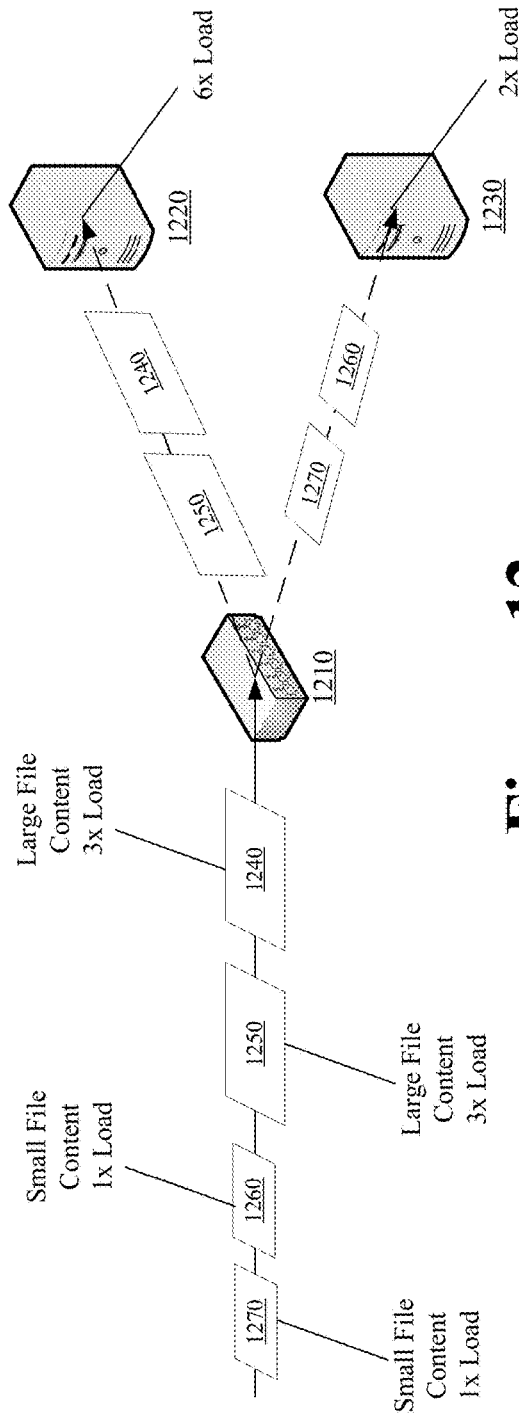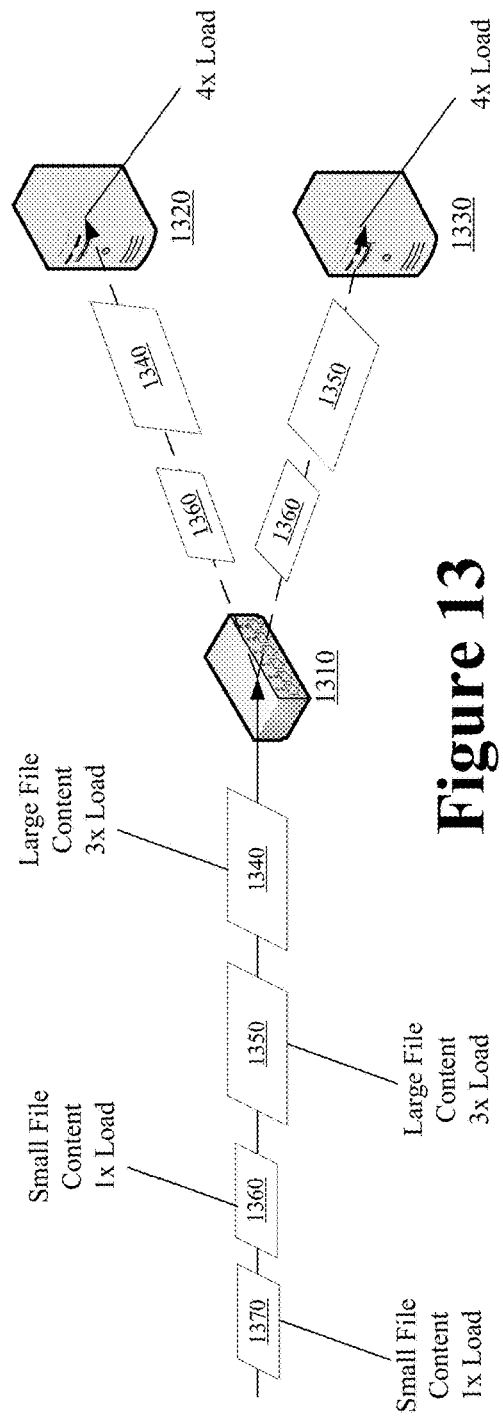

OPTIMIZED CONSISTENT REQUEST DISTRIBUTION FOR BALANCED LOAD DISTRIBUTION IN A CONTENT DELIVERY NETWORK

CLAIM OF BENEFIT TO RELATED APPLICATIONS

This application is a continuation of U.S. non-provisional application Ser. No. 13/737,145, entitled "Optimized Consistent Request Distribution for Balanced Load Distribution in a Content Delivery Network", filed Jan. 9, 2013. The contents of application Ser. No. 13/737,145 are hereby incorporated by reference.

TECHNICAL FIELD

The present invention relates to content delivery networks (CDNs), and more specifically, the invention relates to optimizing distribution of content requests within a CDN.

BACKGROUND ART

Content delivery networks (CDNs) deploy surrogate origin servers, also referred to as caching servers or edge servers, at various points-of-presence (PoPs) that are geographically proximate to large numbers of end users. Each PoP includes multiple edge servers. These edge servers deliver content from various content providers to the geographically proximate end users. The overall end user experience is improved as the resources of the CDN often exceed those of the content providers such that the edge servers can respond to the end user requests more expediently and by virtue of the geographic proximity that the edge servers have to the end users, the requested content is delivered with less latency, jitter, packet loss, etc. than if the same content was otherwise delivered from more distant origin servers of the content providers.

End user content requests that are routed to a particular PoP are distributed across the edge servers of that particular PoP. This distribution primarily serves to partition the load across the edge servers of the particular PoP. How effectively the load is partitioned depends on how effectively the requests are distributed across the edge servers.

A round-robin distribution is a basic scheme in which the edge servers of a PoP are ordered and each incoming content request is distributed to the next edge server in the ordering. This ensures that the edge servers receive an equal amount of content requests. Advantages of the round-robin distribution scheme include its simplicity in terms of resource overhead (e.g., processing and memory) and efficient computation. The round-robin distribution scheme operates without consideration of the content being requested such that the incoming content requests need not be processed. A simple lookup as to the next available server is all that is required to distribute the requests. This allows for a relatively underpowered server to distribute thousands of requests per second and prevents the distribution element within the PoP or network from becoming a bottleneck.

However, the equal distribution of requests provided by any round-robin distribution scheme is less than ideal in the context of a CDN. Each distributed request can consume different amounts of server resources. Consequently, the equal distribution of requests can fail to produce an equal partitioning of load across the edge servers of a PoP. Round-robin distribution is also not a consistent distribution scheme. A first request for particular content may be routed to a first edge server of a PoP and a second request for the same particular content may be routed to a second edge server of a PoP, even though the first edge server may have the particular content already in cache as a result of the first request. Consequently, content is redundantly cached within the PoP (at the first edge server and the second edge server), thereby leading to inefficient usage of storage resources and reduction in the overall cache footprint of a PoP (i.e., overall amount of content that the PoP can cache). Overall performance of the PoP is also reduced as a result of the edge servers having to perform more cache writes and purges when redundantly caching content. Lastly, round-robin distribution results in a higher cache miss ratio. The higher cache miss ratio stems from the distribution schemes inability to guarantee that subsequent requests for the same content are distributed to the same edge server that has previously cached that content. For these and other reasons, round-robin distribution does not provide a well-balanced partitioning of load across edge servers of a PoP.

To address the problems stemming from redundant caching, many CDNs have utilized consistent distribution schemes to distribute content requests amongst edge servers of a PoP. A consistent distribution scheme, such as the Cache Array Routing Protocol (CARP), divides the space of hosted content amongst the edge servers of a specific PoP and ensures that requests for the same content are routed to the same edge server of the specific PoP. This often involves hashing an identifier that uniquely identifies the content being requested to identify the edge server tasked with servicing that content, wherein the hashing consistently identifies the same edge server for the same identifier. The identifier typically includes the Uniform Resource Locator (URL) or some permutation thereof, such as a Uniform Resource Identifier (URI) and Fully Qualified Domain Name (FQDN) as some examples. Other parameters such as the requesting end user's IP address and port combination can also be used as part of the hash.

While consistent distribution schemes have effectively eliminated redundant caching of content in a PoP and the performance impact associated with redundant caching, actual analysis of consistent distribution schemes in use today has revealed a tradeoff between evenness and efficiency of the request distribution produced by these distribution schemes. For instance, CARP is a lightweight efficient distribution scheme that can efficiently distribute thousands of requests, but CARP does so at the expense of a relative uneven distribution. The uneven distribution then results in a poor partitioning of load amongst edge servers in a PoP. Other consistent distribution schemes that rely on cryptographic hashes have produced more even request distributions than CARP. However, these schemes are computationally taxing on the server performing the distribution because of the complexities of the cryptographic hashes. As such, these distribution schemes are unsuitable for use in a CDN framework in which thousands of incoming requests have to be distributed in a short period of time (e.g., few seconds).

To quantify the shortcomings of CARP, FIG. 1 presents results for an actual distribution of requests when using a consistent hashing technique implemented per the CARP specification. The distribution is presented for three different content types across edge servers of two CDN PoPs. In this figure, field 110 represents the total number of requests of a specific content type that a particular PoP distributes during the monitored period. Field 120 represents the fewest requests of a specific content type that any edge server of a particular PoP receives as a result of the CARP distribution.

Field 130 represents the most requests of a specific content type that any edge server of the particular PoP receives as a result of the CARP distribution. Field 140 presents the median number of requests of a specific content type received by the edge servers of a particular PoP. Field 150 presents the standard deviation for the number of requests of a specific content type received by the edge servers of a particular PoP. Lastly, field 160 presents the average time needed to process an incoming request, wherein processing the incoming request includes computing the hash from which the distribution decision is based.

As evident from the distribution of requests presented in FIG. 1, CARP does not provide an even distribution. Specifically, the least utilized edge server receives approximately 25% of the number of requests as the most utilized edge server in a given PoP. When considering that the requests are for the same content type, it can be extrapolated that the least utilized edge server receives a quarter of the load as the most utilized edge server in a given PoP. This uneven distribution causes certain edge servers to be overutilized and others to be underutilized.

One factor behind the uneven distribution produced by CARP is the use of an inadequate hash. The hashes called for in the CARP specification are selected for their computational efficiencies. However, this focus on efficiency produces the uneven distribution shown in FIG. 1. The obvious solution involves replacing the simplistic CARP hashes with more robust hashes. For instance, cryptographic hashes, such as SHA1, can be used to provide a more even distribution. However, cryptographic hashes and other robust hashes incur substantially greater processing overhead, thus rendering these hashes unsuitable for use in a CDN framework.

A second factor behind the uneven distribution is the "one-size fits all" approach to request distribution. Specifically, the same hash is used to distribute "hot" content and "not hot" content. Hot content is content that is requested frequently during a period of time and not hot content is content that is requested infrequently during that period of time. Accordingly, an edge server that receives requests for hot content will be overutilized when compared to an edge server that receives requests for not hot content. Also, the CARP specification does not consider the content that is being requested and the same hash functions are used to distribute different content types irrespective of the disparate load requirements that the different content types may impose on the edge servers. For instance, servicing requests for large file content consumes greater resources of an edge server than servicing requests for small file content. This is because of the additional bandwidth, memory, processing, and connection overhead needed to transmit the larger file. Accordingly, an edge server that receives a disproportionate number of large file content requests will be overutilized when compared to an edge server that receives a disproportionate number of small file content requests.

An even load partition is critical in order to achieve maximum resource utilization in a PoP and the request distribution scheme used is the primary factor in determining these loads. When the request distribution scheme produces an unbalanced load distribution, it will cause the entire capacity of the PoP to be reduced. For example, a PoP with an unbalanced load distribution in which one edge server operates at 95% capacity with other edge servers operating around 60% of capacity will be able to service substantially fewer requests than a PoP with a balanced load distribution in which all edge servers operate at 90% capacity. Accordingly, there is a need for an improved content request distribution scheme. Specifically, there is a need for a scheme that avoids redundant caching in a PoP while providing for a distribution of requests that results in an even partitioning of load amongst edge servers of that PoP. Also, there is a need for such a scheme to remain lightweight and computationally efficient so as to be able to receive, process, and distribute several thousand requests per second.

SUMMARY OF THE INVENTION

Some embodiments implement systems and methods that improve content request distribution in a content delivery network (CDN) or other platform comprising a set of servers. The systems and methods implement and utilize a proprietary consistent distribution scheme that preserves the efficiencies of the Cache Array Routing Protocol (CARP) while providing a significantly more balanced distribution of requests amongst servers of a set of servers on par with distribution schemes reliant on computationally expensive cryptographic hashes.

The proprietary consistent distribution scheme employs two separate hashes. A first hash, or request hash, computes a first value based on an identifier associated with the content being requested. The identifier associated with the requested content is preferably the URL for requesting the content. A second hash, or member hash, computes a second value based on an identifier for each server in the set of servers to which the request can be directed. The identifier for each server is preferably the fully qualified DNS name of the server. The first value is then combined with the second value and the greatest combined value provides a consistent identification of the specific server that is tasked with serving the requested content.

To preserve the efficiencies of CARP and achieve significantly improved even distribution without the overhead introduced by cryptographic hashes, some embodiments implement the hash functions of the distribution scheme with 64-bit variables, a 64-bit prime value, and a series of bitshift operations. Empirical evidence has shown that the shift from 32-bit CARP hashing to the 64-bit hashing of some embodiments provides a significantly more even distribution of requests across a set of servers. The bitshift operations used in the hash function computations mitigate any increased computational overhead incurred as a result of 64-bit variables and are used in place of multiplication operations that are more computationally expensive. The distribution scheme of some embodiments provides, on average, a 90% improvement in standard deviation (i.e., evenness in distribution) over CARP at only a 15% increase in processing time. Other cryptographic hashes, such as SHA1, were seen to provide equivalent even distribution. However, these cryptographic hashes required a 300% increase in computational time when compared to the consistent distribution scheme set forth herein.

However in some instances, an even request distribution across the set of servers does not yield an even load distribution. In other instances, a controlled uneven distribution may be desired to take advantage of certain server properties. Accordingly, some systems and methods implement and utilize a differentiated consistent distribution scheme. The differentiated consistent distribution scheme identifies differentiated content from undifferentiated content with differentiated content referring to a subset of requests or content that is in some way distinguishable from other requests for undifferentiated content. The differentiated consistent distribution scheme adjusts the results of the hash functions using a set of load factor values when hashing a request for differentiated content. A different set of load factor values can be used to adjust the results of the hash functions when hashing a request for undifferentiated content or the results can be left unadjusted. The load factor values target, prioritize, or reserve a subset of the set of servers for the processing of the differentiated content requests. Therefore when the differentiated content requests impose a disproportionate load on the servers receiving those differentiated content requests, the load factor values can be used to distribute those requests to servers that are more capable of processing those requests or to distribute those requests to servers that are underutilized, thereby achieving a more balanced load distribution by way of an even distribution of the undifferentiated content requests and a controlled uneven distribution of the differentiated content requests. In so doing, loads across the set of servers can be better balanced than when strictly adhering to an undifferentiated consistent distribution scheme.

In addition to or instead of the differentiated consistent distribution scheme, some systems and methods implement and utilize a layered distribution scheme to overcome uneven load distribution resulting from a strict adherence to an undifferentiated consistent distribution scheme. The layered distribution scheme applies at least a first distribution scheme for differentiated content requests and a modified second distribution scheme for other undifferentiated content requests to produce a desired variation in request distribution between the differentiated content requests and the undifferentiated content requests. It should be apparent that additional layers (i.e., a third consistent distribution scheme) can be introduced into the layered distribution scheme so as to differentiate content along more than one specific differentiation classification. More specifically, for each classification used to differentiate content, a modified distribution scheme can be introduced and selected in order to specifically distribute requests falling within the specified classification. In so doing, the systems and methods are again able to produce an even distribution of differentiated content requests across the set of servers and a controlled uneven distribution of the differentiated content requests across the set of servers in order to achieve a balanced load distribution across the set of servers.

In some embodiments, content is differentiated on the basis of content type, hotness of content, quality of service, and cacheable versus non-cacheable content. In some embodiments, the differentiated content is dynamically identified and configured by the servers performing the request distribution. The differentiated content identification and configuration can occur in real-time.

BRIEF DESCRIPTION OF THE DRAWINGS

In order to achieve a better understanding of the nature of the present invention, preferred embodiments for systems and methods that provide improved distribution of content requests will now be described, by way of example only, with reference to the accompanying drawings in which:

FIG. 4 evidences the relatively uneven distribution of several million content requests across servers of a PoP when using CARP as the distribution scheme and the significantly more even distribution of the same content requests across the same servers of the PoP when using the distribution scheme of the embodiments provided herein.

FIG. 12 illustrates the potential of an overloaded server when distributing requests in a manner that does not differentiate on the basis of content type.

FIG. 13 illustrates how the potential for overload is avoided when distributing requests in a manner that differentiates on the basis of content type when using the layered consistent distribution scheme of some embodiments.

DETAILED DESCRIPTION

In the following detailed description, numerous details, examples, and embodiments for systems and methods that provide improved distribution of content requests are set forth and described. As one skilled in the art would understand in light of the present description, these systems and methods are not limited to the embodiments set forth, and these systems and methods may be practiced without some of the specific details and examples discussed. Also, reference is made to the accompanying figures, which illustrate specific embodiments in which the systems and methods can be practiced. It is to be understood that other embodiments can be used and structural changes can be made without departing from the scope of the embodiments herein described.

Figure 2:
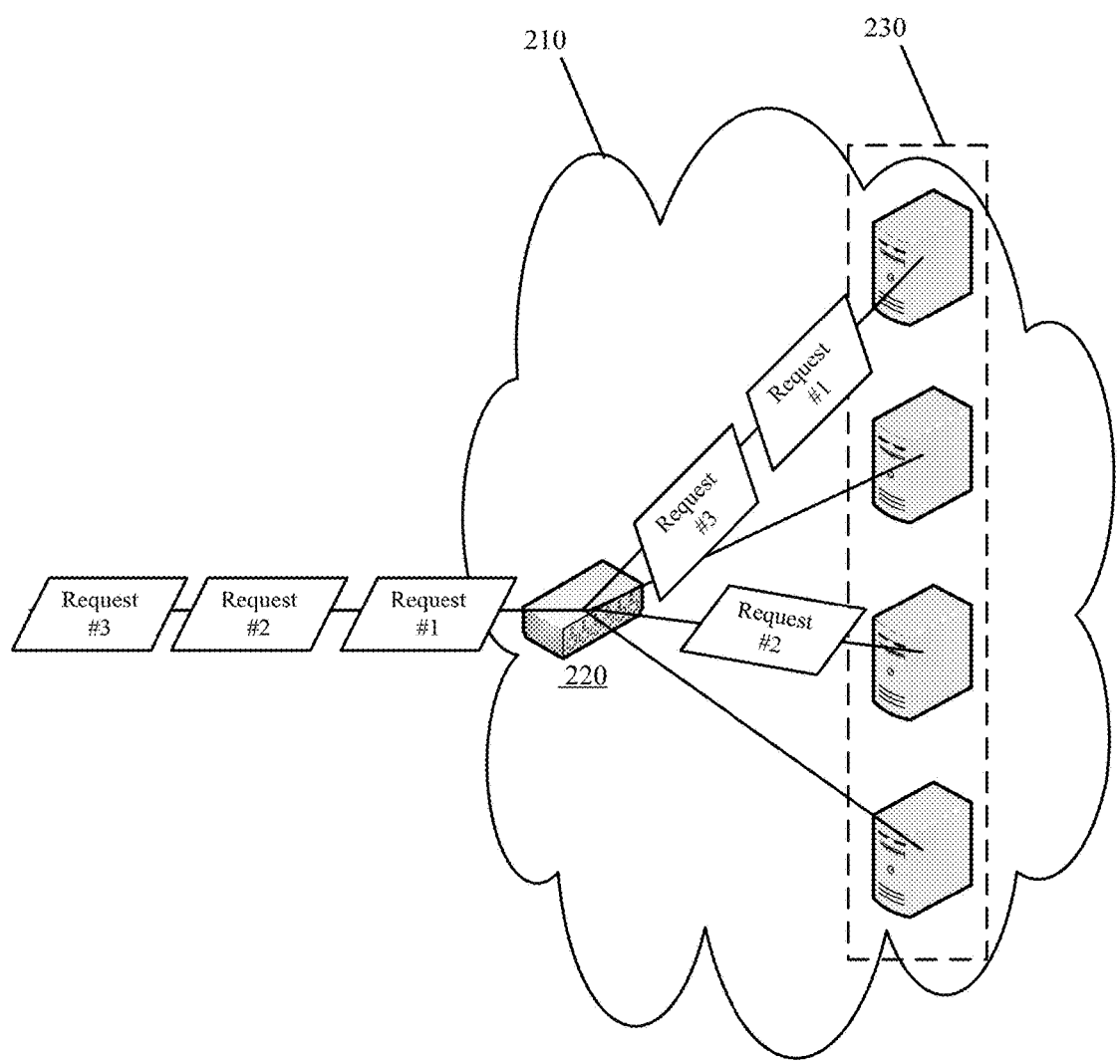
FIG. 2 presents an exemplary architecture for a CDN Point-of-Presence across which content requests are distributed according to a consistent distribution scheme.

To facilitate the discussion that is to follow, FIG. 2 presents an exemplary architecture for a CDN Point-of-Presence (PoP) 210 across which content requests are distributed according to a consistent distribution scheme. The PoP 210 includes a first tier distribution element 220 and several second tier caching elements 230.

The first tier distribution element 220 is tasked with receiving incoming content requests and distributing those requests across the second tier caching elements 230 according to a consistent distribution scheme. The first tier distribution element 220 is a networked server that operates as the entry gateway for any content requests routed to the PoP 210. To receive the incoming requests, the first tier distribution element 220 may be configured with the IP address advertised for the PoP 210. In some embodiments, the first tier distribution element 220 is a director or other load balancing device. As the PoP 210 can receive thousands of content requests per second, the distribution scheme performed by the first tier distribution element 220 must be lightweight and efficient so as to forward the requests without delay. Otherwise, the first tier distribution element 220 can become a bottleneck which has the trickledown effect of leaving the second tier caching elements 230 underutilized. Though the framework of FIG. 2 is discussed in terms of a CDN PoP, it should be apparent that the framework and associated functionality is applicable to any set of servers that serve content irrespective of their operation within a CDN. For example, the set of servers may include content servers of an enterprise or an intranet.

The second tier caching elements 230 include CDN caching servers, edge servers, or any other set of servers that collectively cache and serve content in response to a received request. If a second tier caching element receives a request for content that it does not have locally cached, that second tier caching element accesses an origin server in order to retrieve and forward the content to the requestor, optionally caching the retrieved content. Optionally, the second tier caching element can query another second tier caching element for the content. Each of the second tier caching elements 230 is configured with a storage cache to retain copies of previously requested content. In so doing, the second tier caching elements 230 can serve previously cached copes of content to requestors that subsequently submit requests for the same content. Each caching element of the second tier caching elements 230 can be separate physical machine or a virtual machine running on a shared or partitioned set of physical resources.

The second tier caching elements 230 can be scaled as needed to increase or decrease the collective cache pool of the PoP 210. The scaling occurs with minor modification to the configuration of the first tier distribution element 220, wherein the modification includes updating the first tier distribution element 220 with a complete list of all available servers across which requests can be distributed. As will be apparent below, the consistent distribution scheme of some embodiments automatically adjusts to any added or removed second tier caching element in the list of available caching elements without requiring modification to the distribution methodology.

By virtue of the first tier distribution element 220 performing a consistent distribution, each second tier caching element 230 is designated to serve a specific subset of the overall content that is hosted at the PoP 210. It is therefore necessary to achieve an even distribution of requests across the second tier caching elements 230. Otherwise, an unbalanced distribution can lead to one second tier caching element becoming a bottleneck as its resources are overwhelmed with a disproportionate load while other second tier caching elements go underutilized. Another important factor at play is that each second tier caching element has a finite storage cache. When one second tier caching element receives a disproportionate amount of different content requests, more content will be competing to be cached in the same finite storage cache. This leads to more cache writes as the caching element is more likely to purge old content and write new content when it is receiving a larger volume of requests for different content. These additional cache writes result in a higher cache miss rate as well as degraded performance due to the slowness with which cache writes occur.

Figure 3:
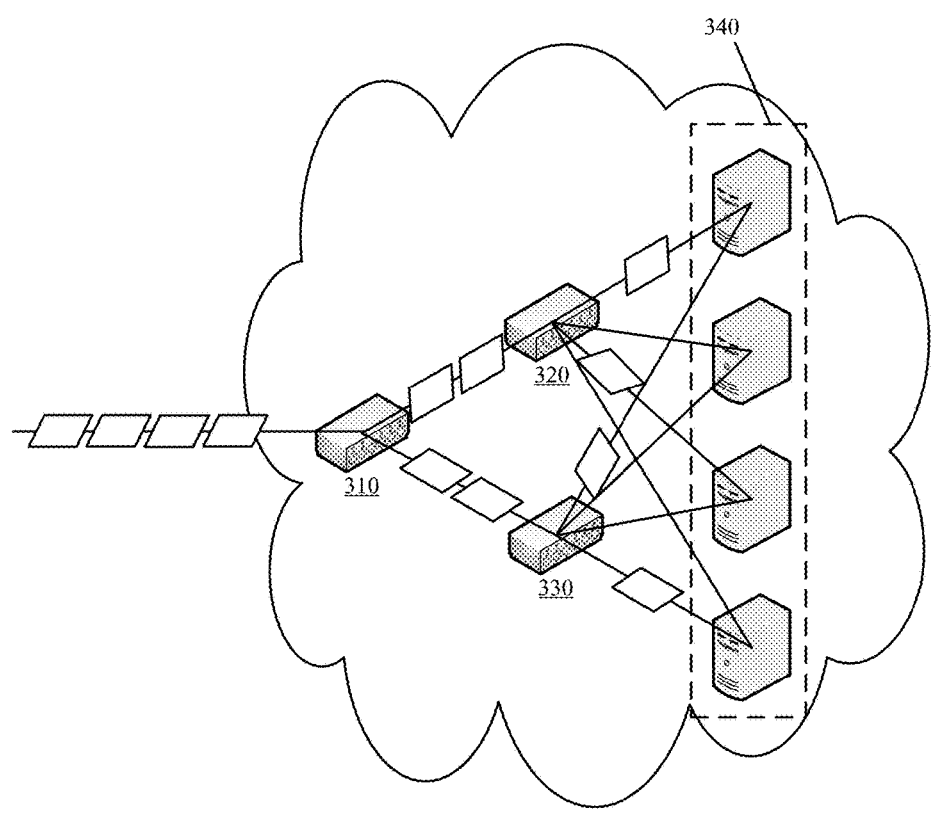
FIG. 3 illustrates scaling a first tier distribution element in accordance with some embodiments.

In some embodiments, the first tier distribution element is scaled to include more than one server instance or process. Such a framework is needed to accommodate request rates that would otherwise overwhelm the most lightweight distribution scheme performed by a single first tier distribution element with the latest generation hardware. FIG. 3 illustrates scaling the first tier distribution element in accordance with some embodiments. In this figure, the first tier distribution elements includes load balancer 310 and two distribution elements 320 and 330. Though two distribution elements 320 and 330 are depicted in the figure, it should be apparent to one of ordinary skill in the art that any number of distribution elements can be used and that more than one load balancer 310 can also be incorporated into this framework. The framework also depicts second tier caching elements 340.

The load balancer 310 receives all incoming content requests similar to the operation of the first tier distribution element 220 in FIG. 2 above. The load balancer 310 performs a first tier distribution of the received content requests to the distribution elements 320 and 330. The load balancer 310 is configured with a lightweight distribution scheme that involves minimal processing of the requests. Round-robin distribution is one suitable distribution scheme for the load balancer 310. Round-robin distribution provides an even distribution of the requests across the distribution elements 320 and 330 albeit without any consideration for the content being requested or where the requested content is stored within the second tier caching elements 340.

Each distribution element 320 or 330 then invokes a consistent distribution scheme based on the methodologies described herein to determine which second tier caching element is tasked with serving the requested content. Although the determination performed by the distribution elements 320 and 330 is computationally more expensive than the distribution performed by the load balancer 310, it will become apparent from actual empirical evidence below that the methodologies described herein preserve the computational efficiencies of CARP while providing an evenness in distribution that equals computationally expensive cryptographic consistent hash distributions, wherein the resulting balanced distribution provides significantly better load distribution across the second tier caching elements than CARP.

I. 64-Bit Consistent Distribution Scheme

To preserve the efficiencies of CARP and achieve significantly improved even distribution without the overhead introduced by cryptographic hashes, some embodiments provide a proprietary 64-bit consistent distribution scheme. This 64-bit consistent distribution scheme involves two separate hashes and a combined hash. The resulting combined hash consistently selects a particular second tier caching element from the set of second tier caching elements to receive and serve requests for a specific subset of the overall content that is hosted by the PoP.

The first hash, also referred to as the request hash, computes a first value based on an identifier associated with the content being requested. The identifier is preferably the URL used to request the content, though the identifier can be any combination of parameters and values that uniquely identify the content being requested. Pseudocode for the request hash of some embodiments is presented below:

```
RequestHashFunction(url) {
    For each character of the url {
        hash64 += (hash64 << 1) + (hash64 << 7) + (value of current url char); }
    hash64 &= 0x7FFFFFFFFFFFFFFF;
}
```

The request hash receives as input, the URL for the content being requested. The URL uniquely identifies the content being requested and can be extracted from an HTTP GET request or other request message. In some embodiments, the URL is filtered prior to being passed as an input to the request hash. The filtering removes parameters from the URL that are unrelated to the content being requested. The parameters can include user specific identifiers and query strings as some examples.

The request hash generates a 64-bit value (i.e., hash64) representing the hash for the URL based on the above specified sequence of bitshift and addition operations for each character of the URL and by performing the specified AND operation with the defined 64-bit constant value. This computation preserves the computational efficiency of CARP by relying on addition and bitshift operations rather than more computationally expensive multiplication operations. It should be apparent to one of ordinary skill in the art that the bitshift operations can be used to efficiently replicate certain multiplication calculations at the binary level. Moreover, the calculations are performed within a single function so as to avoid stack overhead introduced as a result of pushing and popping parameters to a stack each time a call is made to a function.

Unlike CARP, the request hash of some embodiments is derived from calculations on 64-bit variables. The use of 64-bit values is one significant factor in improving the evenness of distribution relative to CARP. Use of 64-bit values relative to 32-bit values (as called for in the CARP specification) provides for a more random distribution of the URLs. This improved random distribution decreases the likelihood that a disproportionate number of URLs are hashed to the same result bucket representing a specific second tier caching element. Consequently, the improved random distribution more evenly distributes the URLs across the available pool of second tier caching elements.

The second hash, also referred to as the member hash, computes a second 64-bit value based on an identifier for each second tier caching element in the available set of second tier caching element. This identifier is preferably the fully qualified DNS name (FQDN) of the second tier caching element. Pseudocode for the member hash of some embodiments is presented below:

```
MemberHashFunction(serverName) {
    For each character of the serverName {
        hash64 += (hash64 << 1) + (hash64 << 7) + (value of current char);
    }
    hash64 += hash64 * PRIME64;
    hash64 = ROTL64(hash64, x);
}
```

The member hash is called for each particular second tier caching element in the set of available second tier caching elements with the input to the member hash being the FQDN of the particular second tier caching element. A 64-bit value (i.e., hash64) representing the hash for the FQDN of each caching element is then computed by performing the above specified sequence of bitshift and addition operations for each character of the FQDN, by multiplying the resulting value with a predefined 64-bit prime number, and by performing a final right to left bitshift operation. The member hash is computationally more expensive than the request hash, however its impact is nullified because the member hash values can be precomputed and reused. It should be apparent to one of ordinary skill in the art that the member hash need only be computed once for each caching element in a PoP when bringing the PoP online or when adding a new caching element to the PoP. The computed member hash values can then be stored and reused for the combined hash computation below.

The member hash is differentiated from the member hash of the CARP specification by utilizing 64-bit values while also performing a set of bitshift operations to compute the hash value for each server based on each character in the server's FQDN. Here again, the transition to 64-bit values expands the number of buckets assigned to each caching element. This results in an improved random distribution which accounts for the improved evenness in requests distribution.

The result of the request hash value is then combined with the result of the member hash for each caching element in the available set of second tier caching elements based on the pseudocode below:

```
CombineHashFunction(requestHash64, memHash64) {
    combHash64 = requestHash64 XOR memHash64;
    combHash64 += combHash64 * COMBPRIME64;
    combHash64 = ROTL64(combHash64, x);
}
```

The result of the combined hash above produces a 64-bit value for each caching element in the available set of caching elements. The largest total value consistently identifies the caching element that is tasked with servicing the URL being requested. Should a caching element suffer a failure and have to be removed, the above described distribution methodology will failover requests originally designated for the failing caching element to the caching element that has the next largest combined hash value.

Superficially, the above described 64-bit consistent distribution scheme resembles the CARP distribution scheme as both are implemented with a request hash, member hash, and combined hash. However, the underlying and fundamental changes to 64-bit values of the present embodiments versus the 32-bit values of the CARP specification and the modified calculations from which the hashes are computed significantly differentiate the embodiments set forth herein from CARP. This differentiation is substantiated by the empirical results presented in FIG. 4.

FIG. 4 evidences the relatively uneven distribution of several million content requests across servers of a PoP when using CARP as the distribution scheme and the significantly more even distribution of the same content requests across the same servers of the PoP when using the 64-bit distribution scheme of the embodiments provided herein. FIG. 4 includes six sets of results 410, 420, 430, 440, 450, and 460 representing how requests for three different content types are distributed across two different PoPs of a CDN when using CARP as the distribution scheme and when using the 64-bit distribution scheme of the embodiments described herein. Each set of results is presented with a column 470 for the total number of distributed content requests, a column 475 for the number of requests that were distributed to the server in the PoP receiving the fewest number of the total number of distributed requests, a column 480 for the number of requests that were distributed to the server in the PoP receiving the greatest number of the total number of distributed requests, a column 485 for the median number of requests received by each server in the PoP, a column 490 for the standard deviation, and a column 495 for the average processing time taken to hash the URL requests when using the 64-bit hashing functions of the 64-bit consistent distribution scheme of some embodiments relative to the processing time taken to hash the URL requests when using the CARP hashing functions.

As can be seen from the results, CARP provides the server receiving the least number of requests with approximately one third or one fourth of the requests received at the server receiving the greatest number of requests, whereas the distribution achieved from the 64-bit consistent distribution scheme of some embodiments only results in a single digit percentage deviation in the number of requests received by the server receiving the least number of requests and the server receiving the greatest number of requests. CARP results in a significantly less even distribution as further evidenced by the nearly ten times variance in standard deviation between CARP and the 64-bit distribution scheme of the embodiments herein.

The results also demonstrate that the 64-bit consistent distribution scheme of some embodiments preserves much of the computational efficiencies of CARP. Specifically, the increase in processing time to achieve these significant improvements in evenness of distribution is relatively minor, with the increase ranging from about 13 nanoseconds to 37 nanoseconds. In comparison, tests were conducted using cryptographic hashing distribution schemes (e.g., SHA1) with those schemes suffering an increase from 220 nanoseconds to about 290 nanoseconds.

Figure 1:
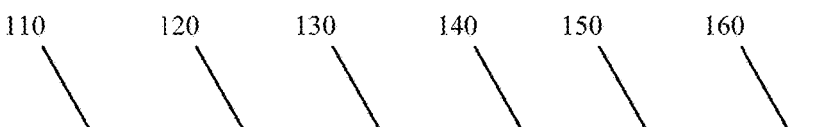
FIG. 1 presents results for an actual distribution of requests when using a consistent hashing technique implemented per the CARP specification.

These significant improvements do not stem from obvious changes to CARP or other existing distribution schemes. It was previously assumed that CARP provided a relatively even distribution and was widely implemented because of this belief and because of its efficient operation. The inventors independently identified the poor distribution characteristics of CARP as seen in FIGS. 1 and 4. The inventors also tested other documented consistent distribution schemes, but could not find one that preserved the efficiencies of CARP and the even distribution of computationally expensive cryptographic distribution schemes. Therefore, the inventors set about and created the 64-bit consistent distribution scheme described herein to address their needs.

While the 64-bit consistent distribution scheme of the embodiments described above ameliorates the shortcomings of CARP by significantly improving the evenness in request distribution, it nevertheless provides an undifferentiated distribution of the content requests. In other words, the scheme consistently and evenly distributes the requests amongst caching elements in a PoP without consideration as to the content being requested. This produces an efficient and even distribution of the content requests, but does not necessarily produce a balanced load distribution across the caching elements of the PoP.

An unbalanced load distribution may result due to some content requests imposing greater burden on a caching element than other content requests. For example, a content request for a large file, such as a video, will consume server bandwidth for a longer period of time than a content request for a small file, such as a text document. As a result, it is possible to achieve a consistent and even request distribution but an uneven load distribution amongst the caching elements of a PoP. This situation can then increase the likelihood of a bottleneck forming in the PoP with the degraded performance of one overutilized caching element impacting the performance of other caching elements in the PoP. Examples of some other types of content that can impose different burdens on the servers include secured or encrypted content versus unsecured or unencrypted content.

Other factors can similarly produce an uneven load distribution irrespective of the consistency or evenness with which a content distribution scheme allocates content requests across the set of caching elements. One such factor involves "hot" content. Hot content is content that receives abnormally high demand during a period of time. Hot content can include streaming of live events, newly released content, or other time-sensitive content (e.g., news, photos, etc.). Using a distribution scheme that consistently forwards requests for an instance of hot content to a specific caching element can cause that specific caching element to be overrun due to the spike in requests that are associated with that hot content. The specific caching element receives a disproportionate load which can lead to degraded performance of that specific caching element, the PoP or, the CDN in which the specific caching element operates.

Yet another factor that can lead to unbalanced load distribution from an even distribution of content requests is the available resources of each caching element in a PoP. It is not uncommon for a PoP to include caching elements operating on legacy hardware and caching elements operating on newer generation hardware. Accordingly, those caching elements operating on newer generation hardware will be able to process content requests faster than other caching elements operating on legacy hardware and the newer caching elements should therefore receive a disproportionate amount of the requests and load. Though beyond the scope of this discussion, it should be apparent that other factors can also render an even consistent distribution inadequate for achieving even load distribution in a PoP or CDN.

Accordingly, some embodiments optimize the 64-bit consistent distribution scheme for differentiated request distribution based on one or more differentiating factors. The optimizations allows for a first tier distribution element to achieve an even distribution of requests for undifferentiated and a controlled uneven distribution of request for differentiated content when the requests for differentiated content are known or expected to impose a disproportionate load on the servers than the requests for undifferentiated content.

Differentiated content refers to a subset of requests or content that is in some way distinguishable from other requests or content (i.e., undifferentiated content). Some differentiating factors used in optimizing the consistent distribution scheme of some embodiments include content type, hotness of content, server capability, quality of service, and cacheable versus non-cacheable content. However, any other differentiating factor can also be utilized.

Some embodiments identify and configure the content that is designated as differentiated content autonomously and dynamically and other embodiments do so on reliance of a human operator.

II. Differentiated Consistent Distribution Scheme

Some embodiments provide a differentiated consistent distribution scheme that provides a differentiated distribution on the basis of one or more differentiating factors. The differentiated consistent distribution scheme does so by incorporating a load factor parameter in the consistent distribution scheme. The load factor parameter is applied to modify the results of the hashes produced for requests of differentiated content. The modified results achieve a controlled uneven distribution for differentiated content requests while an even distribution for undifferentiated content requests is unaffected. More specifically, the load factor parameters allow for the targeting, prioritization, or reservation of certain second tier caching elements for the differentiated content requests.

In some embodiments, the load factor is a value between zero and one that is assigned to each caching element of the second tier caching elements. The value is multiplied to the result of the member hash or combined hash. This then affects the frequency with which a request is distributed to that caching element. In so doing, the distribution scheme can be manipulated so as to increase or decrease the likelihood of any specific caching element being selected to receive and service a content request. Through this manipulation, certain caching elements can be targeted, prioritized, or reserved for servicing the differentiated content requests.

Figure 5:
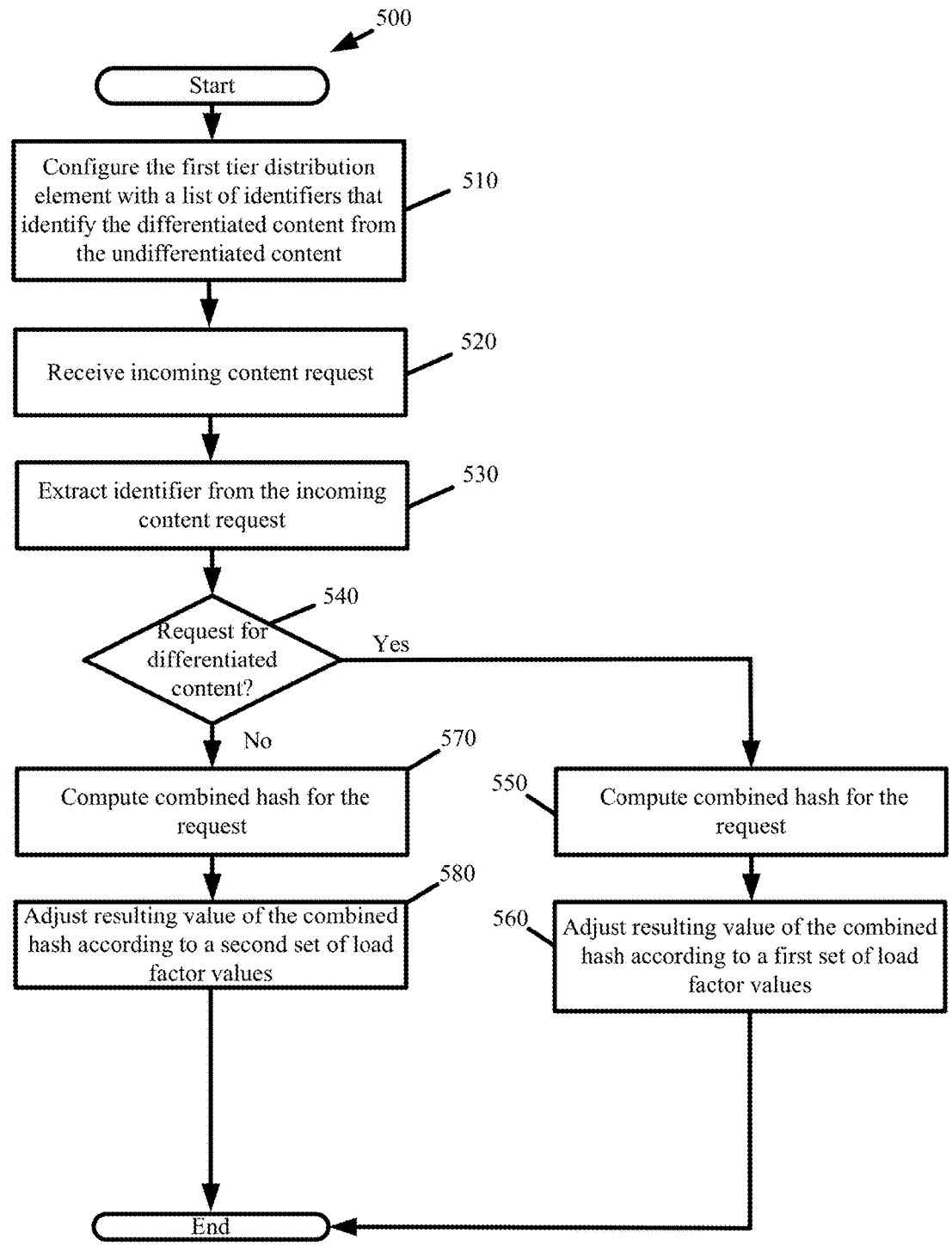
FIG. 5 presents a process using the load factor values to provide a differentiated distribution of requests in accordance with some embodiments of the differentiated consistent distribution scheme.

Using the load factor parameter, the differentiated consistent distribution scheme can be tuned to account for one or more differentiating factors such as content hotness, content type, quality of service, server capability, etc. FIG. 5 presents a process 500 using the load factor values to provide a differentiated distribution of requests in accordance with some embodiments of the differentiated consistent distribution scheme. The process 500 is performed by a first tier distribution element that is tasked with distributing incoming content requests across a set of second tier caching elements.

The process commences by configuring (at 510) the first tier distribution element with a list of identifiers that identify the differentiated content from the undifferentiated content. This list can include URLs, domain names, file extensions, and IP addressing as some examples of differentiating identifiers. This list can be used to differentiate hot content from not hot content, secure content from unsecure content, cacheable content from non-cacheable content, and to differentiate on the basis of content type, quality of service, and various other factors as desired.

Next, the process receives (at 520) a content request that is to be distributed to a caching element in a set of second tier caching elements. The process extracts (at 530) an identifier from the request, wherein the identifier that is to be extracted is determined based on the list of identifiers configured to the first tier distribution element and/or based on the classification being used to determine differentiated content from undifferentiated content. For example, if the first tier distribution element is configured with a list of URLs that identify hot content, the process extracts a URL from the content request.

The process determines (at 540) whether the request is for differentiated content or undifferentiated content based on whether the extracted identifier matches to an identifier in the configured list of identifiers. When the request is for differentiated content, the process computes (at 550) the hash for the request as per the pseudo code presented above and the resulting value is adjusted (at 560) according to a first set of load factor values prescribed to each of the set of caching elements. When the request is for undifferentiated content, the process computes (at 570) the hash for the request as per the pseudo code presented above and the resulting value is adjusted (at 580) according to a second set of load factor values prescribed to each of the set of caching elements, wherein the first set of load factor values differs from the second set of load factor values. In some embodiments, the second set of load factor values are the same value for each caching element so as to preserve the original even distribution computed by the consistent distribution scheme. In some embodiments, the process does not perform step 580, thereby leaving the results of the hashes computed for the undifferentiated content request unadjusted. In any case, the first set of load factor values cause the differentiated content requests to be distributed differently than the undifferentiated content requests in a manner in which the load factor values can be used to target, prioritize, or reserve certain caching elements for processing of the differentiated content requests. The differentiated distribution using the load factor values is illustrated by FIGS. 6 and 7.

Figure 6:
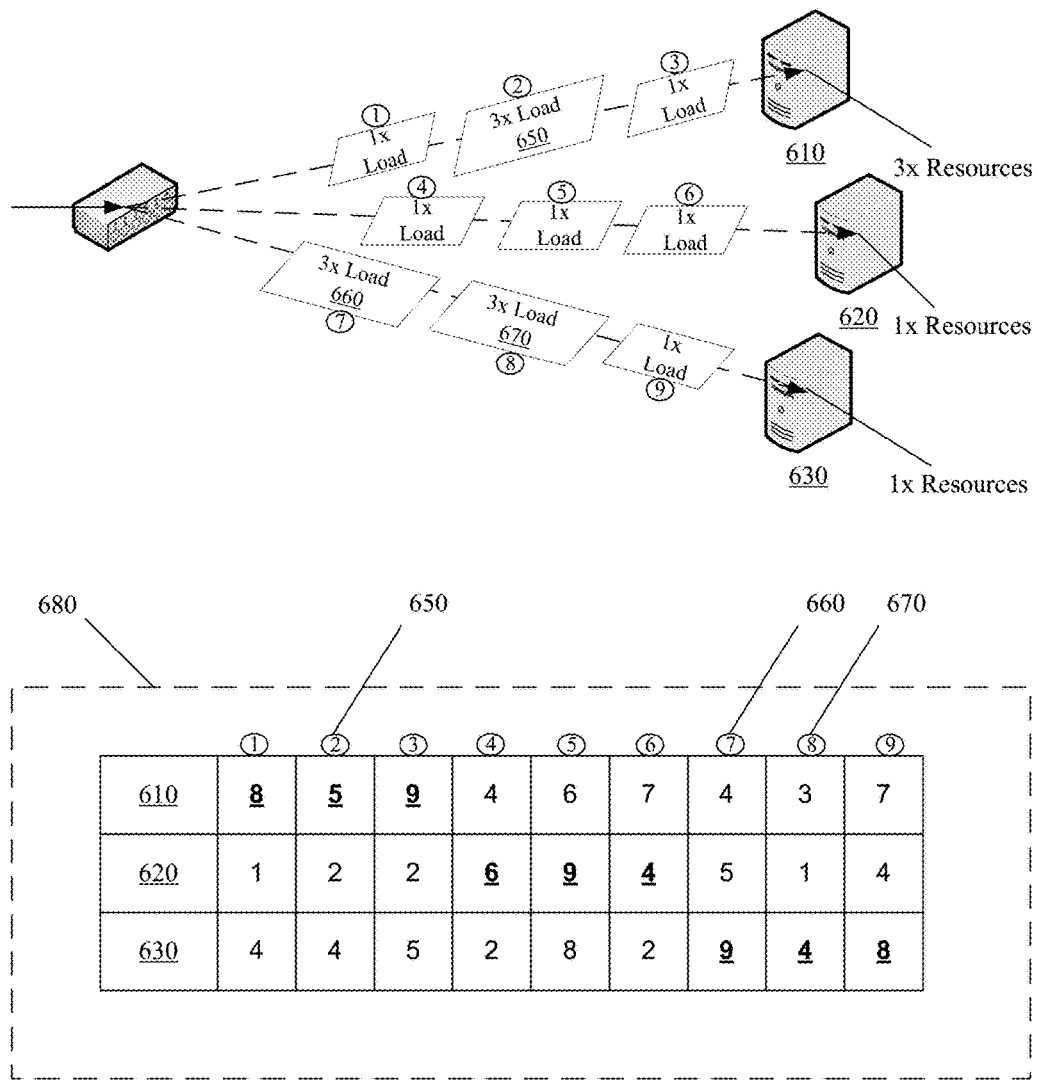
FIG. 6 illustrates an undifferentiated distribution of requests which leads to an unbalanced load distribution in a PoP.

FIG. 6 illustrates an undifferentiated distribution of requests which leads to an unbalanced load distribution in a PoP having caching elements 610, 620, and 630. Each of the caching elements 610, 620, and 630 receives three requests. However, the distribution in this figure is undifferentiated and requests 650, 660, and 670 are different than the other requests as they impose a threefold resource overhead on the caching element processing those requests. For example, requests 650, 660, and 670 can be for large file content while the other requests are for small file content. Caching element 610 receives request 650 and caching element 630 receives requests 660 and 670. Also, caching element 610 differs from caching elements 620 and 630 in that it has three times the resources as the other caching elements 620 and 630. Therefore even though each caching element 610, 620, and 630 receives three requests as a result of the undifferentiated request distribution, the load on these caching elements differs.

Table 680 conceptually illustrates how the distribution occurs by providing exemplary values for the combined hash resulting from an undifferentiated distribution. It is assumed for the purposes of this figure that the combined hash values range between 1-9. Each request is distributed to the caching element having the highest combined hash value for that request.

Figure 7:
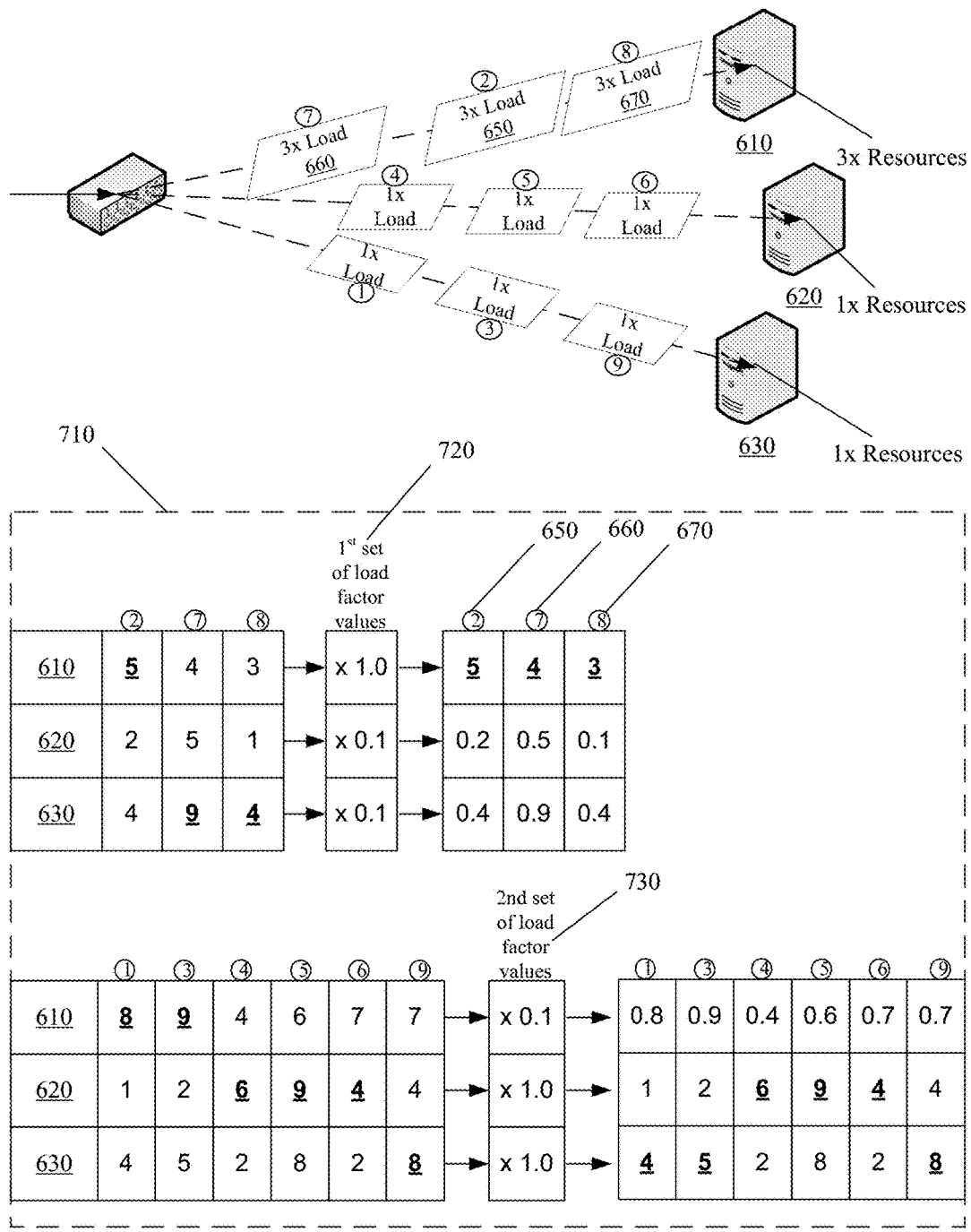
FIG. 7 illustrates using the differentiated consistent distribution scheme of some embodiments to resolve the unbalanced load distribution identified in FIG. 6.

FIG. 7 illustrates using the differentiated consistent distribution scheme of some embodiments to resolve the unbalanced load distribution. The same framework is illustrated. However in this figure, a first set of load factor values 720 are used to reserve caching element 610 for processing the differentiated content requests 650, 660, and 670 and a second set of load factor values 730 are used to cause the other requests to be distributed evenly across the other caching elements 620 and 630. As shown in table 710, the first set of load factor values 720 adjusts the combined hash values for the differentiated content requests such that caching element 610 is targeted for those differentiated requests and the second set of load factor values 730 adjusts the combined hash values for the undifferentiated content requests such that caching element 610 is deemphasized and caching elements 620 and 630 are targeted for those undifferentiated requests.

FIGS. 5-7 generally present how the load factor values can be used to provide a differentiated distribution with FIG. 7 provided as an exemplary case for differentiating between large file content and small file content. Some other examples are given below to further substantiate the motivations for performing the differentiated distribution.

In some embodiments, the load factor is used to optimize the consistent distribution scheme for differentiated quality of service. Quality of service can be differentiated by allocating more resources to ensure more expedient delivery for content of a premium customer and fewer resources to provide a best effort delivery for content of a non-premium customer, wherein a customer is a content provider that offloads its content to the set of caching elements for delivery. In this scenario, the first tier distribution element is configured with a list of URLs or domain names of premium customers so that the content of those customers can be differentiated. Upon receiving a request for the content of a premium customer, the first tier distribution element hashes the request according to the consistent distribution scheme and then adjusts the values using a first set of load factor values to ensure those differentiated requests are distributed over a set of reserved, powerful, or otherwise underutilized set of caching elements. Requests for undifferentiated content, or requests for content of non-premium customers in this example, are distributed by adjusting the resulting hashed values according to a second set of load factor values.

In some embodiments, the load factor is used to optimize the consistent distribution scheme for differentiated distribution of hot content. In such scenarios, the first tier distribution element differentiates requests using the URLs of the hot content. Upon receiving a request for hot content, the first tier distribution element computes the hash for the request using the consistent distribution scheme and adjusts the value using a set of load factor values that ensure that hot content requests are distributed to one or more powerful caching elements with small cache footprints. These caching elements are well suited to serve large amounts of a small set of content. A different set of load factor values ensure that requests for not hot content are distributed across other servers that are less powerful but that have larger cache footprints, wherein these servers are optimal for responding to a lower quantity but more diversified set of requests.

In some embodiments, the load factor is used to optimize the consistent distribution scheme for differentiated distribution of secure content. Secure content often involves one or more layers of encryption. This encryption adds processing overhead which imposes a greater load on the caching elements that receive these requests. Accordingly, it would be advantageous to differentiate requests for secure content from requests for unsecure content and to use the load factor values to distribute the requests for secure content to more powerful caching elements or caching elements with special hardware configured to efficiently perform the encryption and decryption.

Similar considerations warrant the differentiated distribution of cacheable and non-cacheable content. Non-cacheable content manifests as dynamic content or customized content. Such content is not cacheable and must be generated dynamically upon request. Accordingly, some embodiments perform the differentiated distribution of cacheable content using the load factor values to ensure that requests for cacheable content are distributed across caching elements with large cache footprints but with lesser processing resources, whereas requests for non-cacheable content are distributed across caching elements with sufficient processing resources and a smaller cache footprint.

In some embodiments, the load factor is used to optimize the consistent distribution scheme for differentiated server capability. Sometimes, a PoP is constructed to include a mix of caching elements that run on legacy hardware and caching elements that run on newer generation hardware. The caching elements running on the newer generation hardware can process a larger number of requests than the caching elements running on the legacy hardware. Therefore, an even distribution of requests across these caching elements would produce a poor load distribution. In such situations, the load factor values can be used to produce a controlled uneven distribution in which the more powerful caching elements receive a larger share of the overall set of requests.

In some embodiments, a first tier distribution element adjusts the differentiated distribution by autonomously and dynamically identifying the one or more differentiating factors and the load factor parameters to be used. To do so, the first tier distribution element is communicably coupled with each of the second tier caching elements receiving requests from the first tier distribution element. Periodically, the first tier distribution element aggregates usage or statistical logs from the second tier caching elements. These logs record what content has been requested and served by each server, time needed to satisfy each request, whether the content was previously in cache, whether the content was cacheable, etc. The first tier distribution element processes the logs to then identify the differentiating factor to be used in the differentiated distribution of requests. For example, the first tier distribution element can identify that a specific content has been requested some threshold number of times in a specified interval. This specific content can then be identified as hot content and the load factor parameters used in distributing hot content can be modified to allocate additional resources or alter the distribution as needed. As another example, the first tier distribution element can differentiate URLs for large file content from small file content based on the processing time statistic in the logs. The load factor parameters can then be changed to reserve additional resources for the large file content or target an optimal caching element for the large file content requests. Other differentiating factors can similarly be autonomously identified leading to a dynamic modification for how the differentiated distribution is performed.

Autonomous and dynamic operation is advantageous in a CDN PoP as the content being served can change over time, the hotness of content changes over time, and the user demand changes over time. Additional examples of dynamically changing the differentiated distribution are described with reference to FIG. 11 below.

III. Layered Consistent Distribution Scheme

Other frameworks can also be used to optimize the consistent distribution scheme for differentiated distribution. Some embodiments utilize the 64-bit consistent distribution scheme in a layered framework, referred to hereafter as the layered consistent distribution scheme. The layered consistent distribution scheme distributes requests for undifferentiated content according to a first 64-bit consistent distribution scheme and distributes requests for differentiated content according to at least a second 64-bit consistent distribution scheme. The first distribution scheme is optimized to prioritize an even distribution of requests for the undifferentiated content and the second distribution scheme is optimized to prioritize an even load distribution over an even distribution of requests by consideration of the impact imposed by the differentiated content requests.

Figure 8:
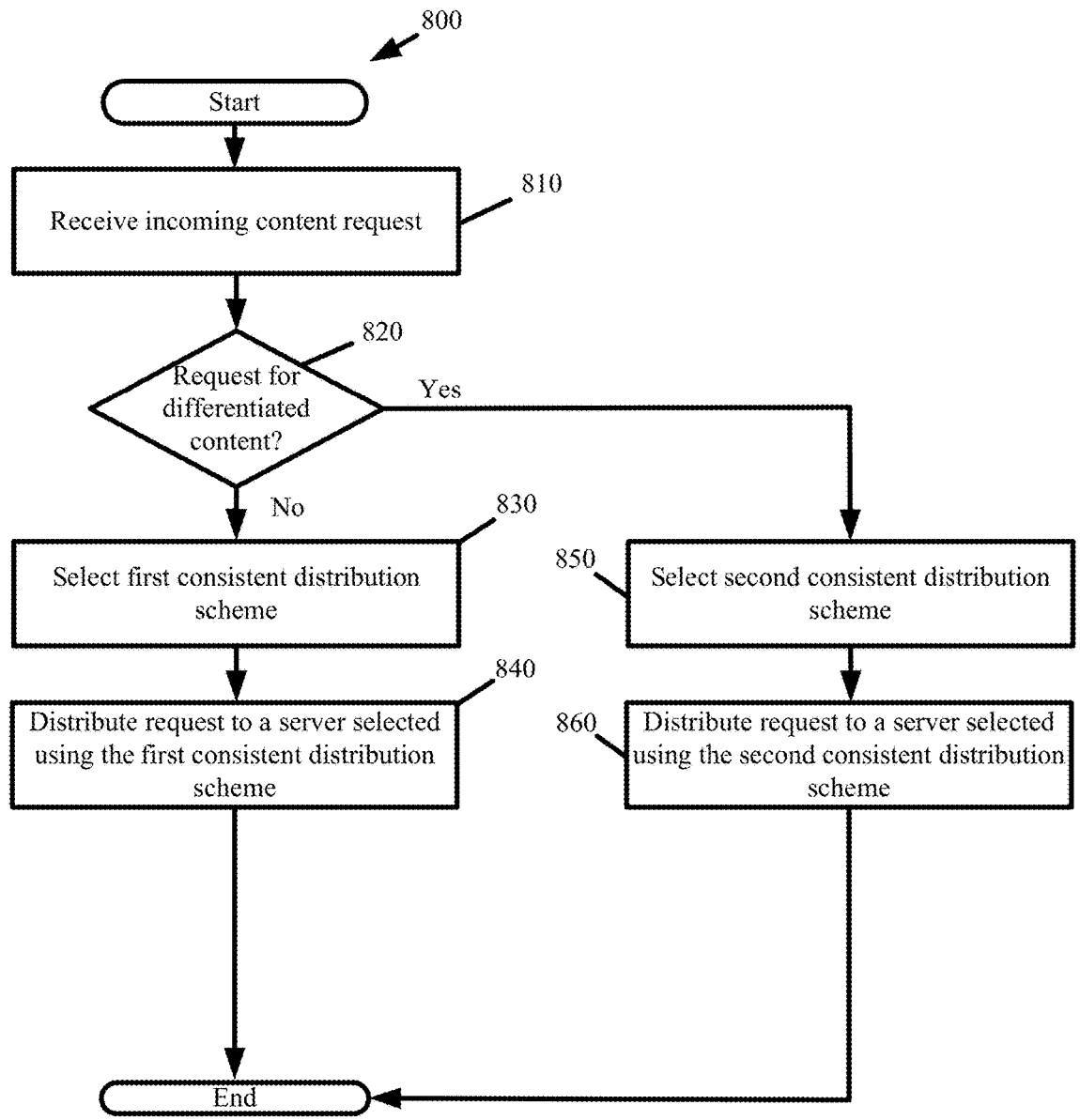
FIG. 8 presents a process for generally distributing content requests according to the layered consistent distribution scheme of some embodiments.

FIG. 8 presents a process 800 for generally distributing content requests according to the layered consistent distribution scheme of some embodiments. The process 800 is performed by a first tier distribution element that is tasked with distributing incoming content requests across a set of second tier caching elements. The objective of the first tier distribution element is to achieve an even load distribution by differentiating the content requests on the basis of at least one differentiating classification.

The process commences when the first tier distribution element receives (at 810) a content request. The process analyzes the content request to ascertain (at 820) whether it should be classified as differentiated content or undifferentiated content. To perform the analysis, the first tier distribution element is configured with a parameter list identifying the differentiated content. The first tier distribution element extracts one or more identifiers from the incoming content request to compare against the parameter list in order to make the classification determination. The parameter list and identifiers used to perform the classification vary based on the differentiator being used. For instance, hot content can be differentiated using a URL, content types can be differentiated on the basis of a file extension, content providers can be differentiated using a domain name, users can be differentiated using their IP address, and non-cacheable content can be differentiated based on the presence of a query string parameter in the URL being requested. Should the one or more extracted identifiers from the content request match with a value in the parameter list, the first tier distribution element can classify the request as one for differentiated content. Otherwise, the request is classified as undifferentiated content.

For an undifferentiated content request, the process selects (at 830) a first consistent distribution scheme and distributes (at 840) the request to a caching element of a PoP according to the result of the first consistent distribution scheme. As noted above, the first consistent distribution scheme achieves an even load distribution by prioritizing an even distribution of requests across the available set of second tier caching elements with an underlying assumption that the undifferentiated content requests impose an even overhead on the caching elements tasked with processing those requests.

For a differentiated content request, the process selects (at 850) a second consistent distribution scheme and distributes (at 860) the request to a caching element of the PoP according to the result of the second consistent distribution scheme. The second consistent distribution scheme also strives to achieve an even load distribution. However, the second consistent distribution scheme prioritizes load considerations imposed by the differentiated content over evenness in distribution. Examples below directed to specific differentiators aid in how the second consistent distribution scheme prioritizes these load considerations over evenness of request distribution.

Figure 9:
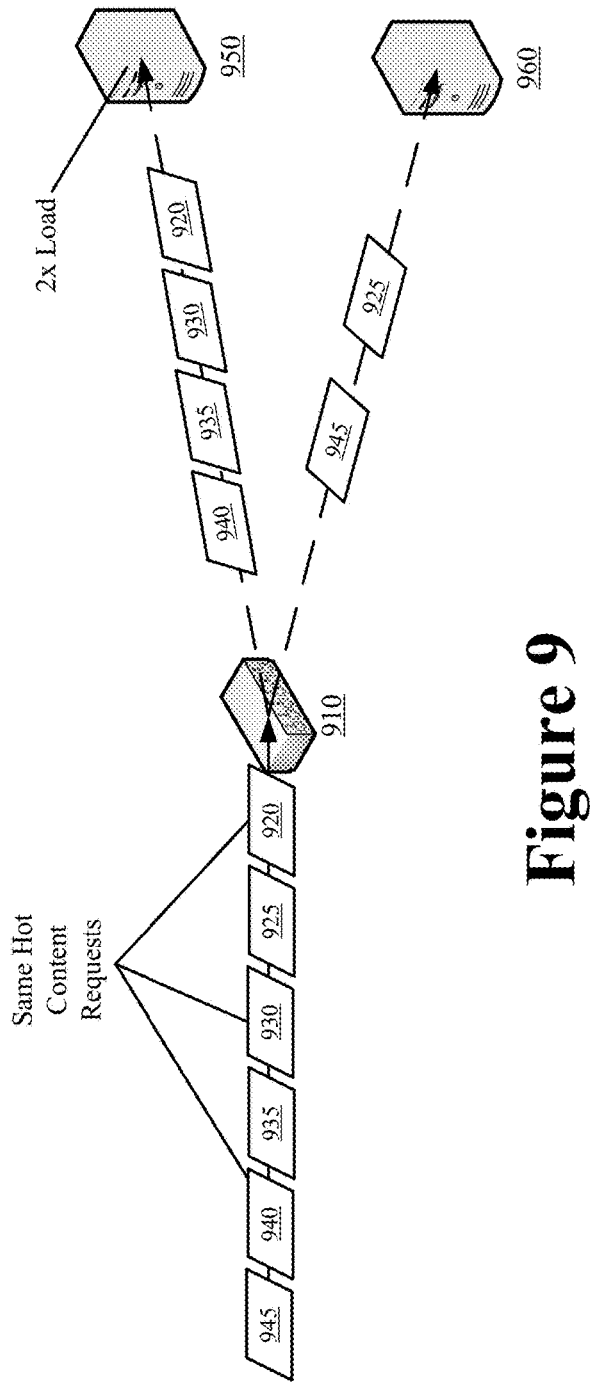
FIG. 9 illustrates the potential of an overloaded server when distributing requests involving hot content in an undifferentiated manner according to a consistent distribution scheme.
Figure 10:
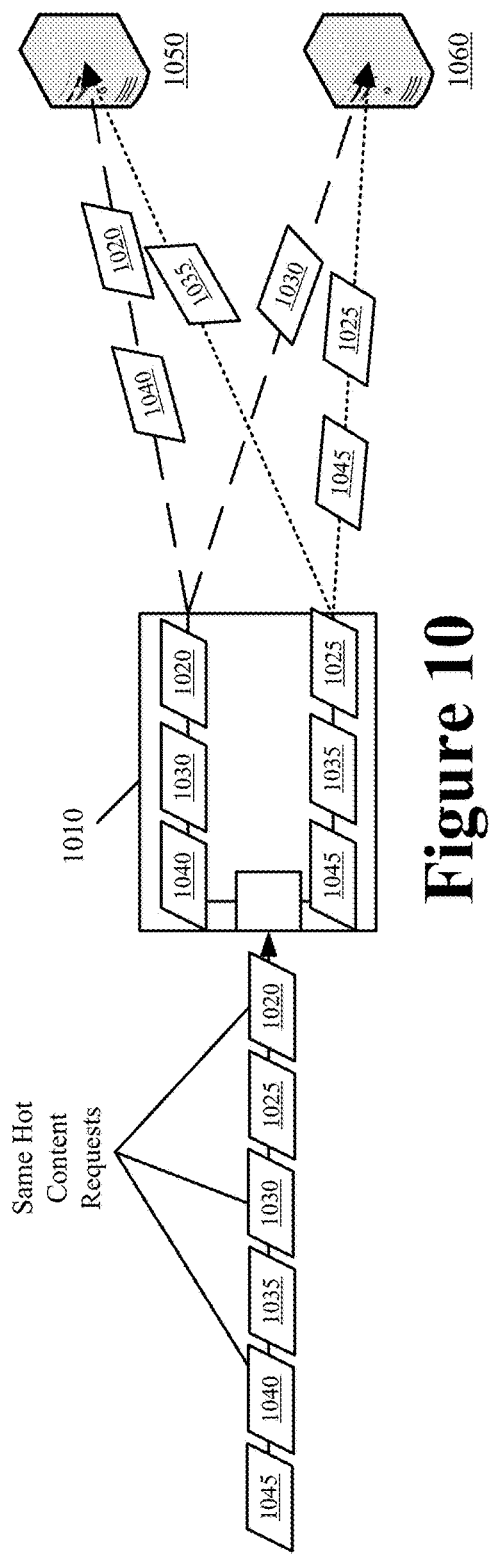
FIG. 10 illustrates how a potential for overload is avoided when distributing requests in a differentiated manner according to the layered consistent distribution scheme of some embodiments in which hot content is differentiated and distributed according to a first consistent distribution scheme and other not hot content is distributed according to a second consistent distribution scheme.

FIG. 9 illustrates the potential of an overloaded server when distributing requests involving hot content in an undifferentiated manner according to a consistent distribution scheme. FIG. 10 then illustrates how the potential for overload is avoided when distributing requests in a differentiated manner according to the layered consistent distribution scheme of some embodiments in which hot content is differentiated and distributed according to a first consistent distribution scheme and other not hot content is distributed according to a second consistent distribution scheme.

In FIG. 9, a first tier distribution element 910 distributes a set of six requests 920, 925, 930, 935, 940, and 945 in an undifferentiated manner using a consistent distribution scheme across two second tier caching elements 950 and 960. Requests 920, 930, and 940 are requests for the same hot content and requests 925, 935, and 945 are different requests for other not hot content. Accordingly, four different items of content are being requested. In this figure, the consistent distribution scheme does not differentiate on the basis of content hotness and therefore performs an even distribution of the four different items of content such that caching element 950 receives the requests for two of the four items of content being requested and caching element 960 receives the requests for the other two of the four items of content being requested. However, because of the consistent and undifferentiated distribution, the caching element 950 receives all the requests associated with the same hot content (e.g., 920, 930, and 940) and one request for the other not hot content 925 and caching element 960 receives requests 935 and 945. Clearly, the result is an uneven load distribution as the first tier distribution element 910 does not differentiate the hot content from the not hot content and forwards all requests for the hot content to the caching element 950, thereby imposing twice the load on the caching element 950 as on the caching element 960.

FIG. 10 illustrates using the layered consistent distribution scheme to perform differentiated distribution of hot content and not hot content in accordance with some embodiments. As in FIG. 9, the first tier distribution element 1010 distributes six content requests 1020, 1025, 1030, 1035, 1040, and 1045 across two second tier caching elements 1050 and 1060, wherein the requests 1020, 1030, and 1040 are for the same hot content. However, the first tier distribution element 1010 performs the request distribution according to a layered consistent distribution scheme. The layered consistent distribution scheme differentiates content on the basis of hotness and distributes not hot content requests according to a first consistent distribution scheme and hot content requests according to a second consistent distribution scheme.

The first consistent distribution scheme is optimized for evenness of distribution. Accordingly, the not hot content requests 1025, 1035, and 1045 are distributed evenly with the caching element 1050 receiving request 1035 and the caching element 1060 receiving requests 1025 and 1045.

The second consistent distribution scheme prioritizes load distribution for the hot content requests 1020, 1030, and 1040. Therefore, instead of consistently distributing the requests for the same hot content to one caching element, the second consistent distribution scheme is modified to consistently distribute the hot content requests across both caching elements such that caching element 1050 receives requests 1020 and 1040 and caching element 1060 receives request 1030. In some embodiments, the second consistent distribution scheme implements the pseudo code presented above, but is modified so as to perform a round-robin distribution of the request across the caching elements with the two largest combined hash values. In so doing, hot content requests are consistently distributed to one of two caching elements in an alternating manner.

Since hotness of content can change over time, the layered consistent distribution scheme must adapt accordingly. To preserve the autonomy of the layered consistent distribution scheme and minimize human involvement, some embodiments provide a framework that dynamically identifies hot content and automatically configures the layered consistent distribution scheme for the changing hotness of content.

Figure 11:
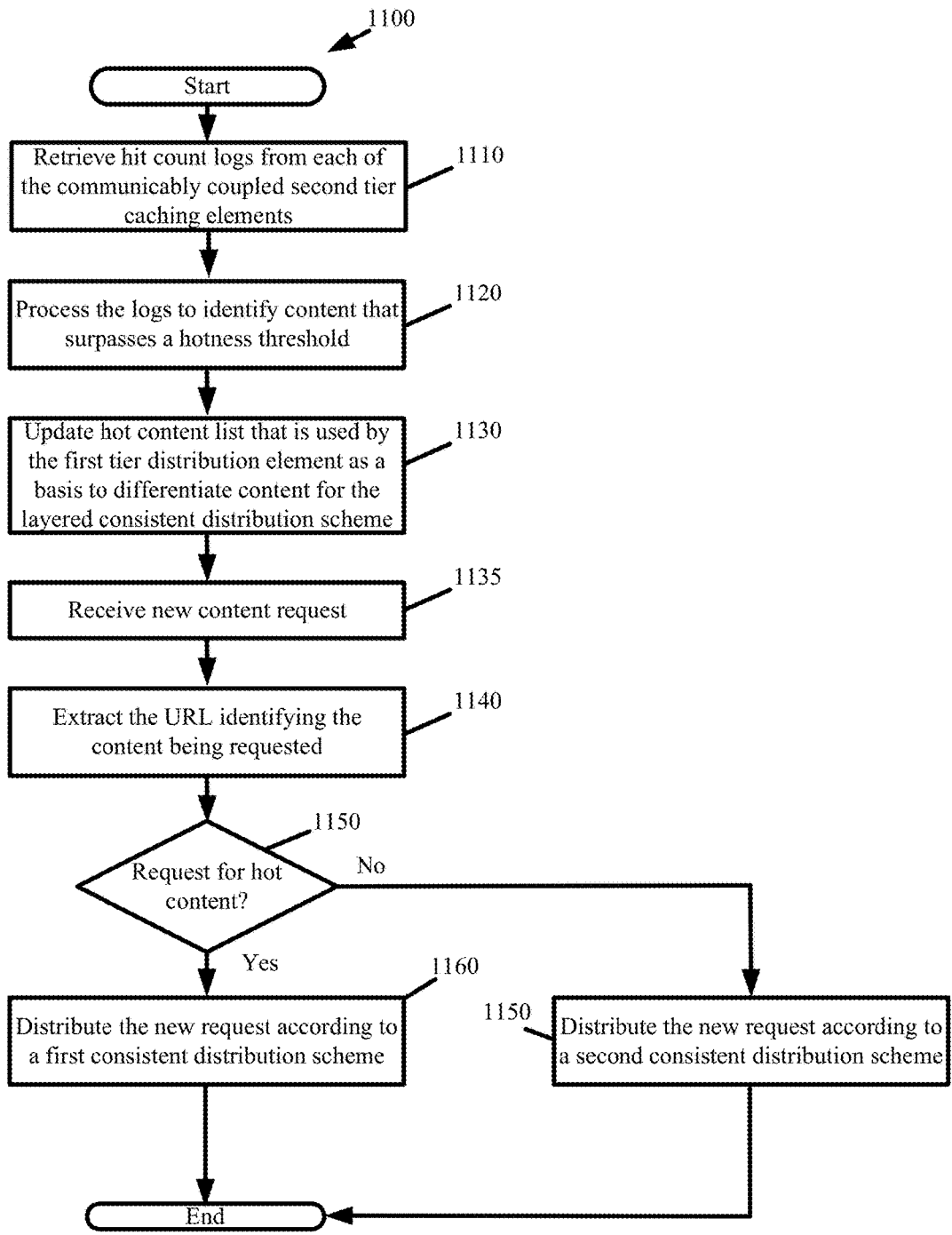
FIG. 11 presents a process for automatically modifying the layered consistent distribution scheme to account for changing hotness of content in accordance with some embodiments.

FIG. 11 presents a process 1100 for automatically modifying the layered consistent distribution scheme to account for changing hotness of content in accordance with some embodiments. Process 1100 is performed by any first tier distribution element that is communicably coupled to one or more of the second tier caching elements.

Process 1100 commences with the first tier distribution element retrieving (at 1110) hit count logs from each of the communicably coupled second tier caching elements. The hit count logs identify what content each caching element has served and the number of times that content was served over a given interval. The first tier distribution element processes (at 1120) the logs to identify content that surpasses a hotness threshold. The hotness threshold is typically surpassed when the same content is requested a specified number of times in a specified period of time. Some embodiments identify requested content based on the URL used to request that content.

The process updates (at 1130) a hot content list that is used by the first tier distribution element to differentiate content for the layered consistent distribution scheme. The hot content list tracks content identified to have surpassed the hotness threshold in the current or previous interval. The hot content list contains the URLs identifying the hot content. In some embodiments, the hot content list can also be shared with other first tier distribution elements in the same PoP or elsewhere in a CDN.

When a new content request is received (at 1135) at the first tier distribution element, the process extracts (at 1140) the URL identifying the content being requested. Next, the process classifies and differentiates the incoming content request by determining (at 1150) if the extracted URL is in the hot content list.

If the extracted URL matches to an entry in the hot content list, then a first consistent distribution scheme is used (at 1160) to distribute the request. Otherwise, a second consistent distribution scheme is used (at 1170) to distribute the request.

The process 1100 is periodically run to autonomously update the hot content list. This allows the layered consistent distribution scheme to self-configure and to dynamically account for changing content hotness Differentiated distribution can also be achieved using a layered consistent distribution scheme that differentiates on the basis of content type. It is well known that requests for different types of content impose different load requirements on servers. Satisfying requests for large file content consumes more server resources (e.g., processing, memory, and bandwidth) than satisfying requests for small file content. Large file content includes content that is often several megabytes in size. Multimedia presentations, games, and video are representative of large file content. When a request for large file content is received, the receiving server spends several seconds, if not minutes, satisfying that request during which time some percentage of the receiving server's resources are occupied for the purpose of satisfying that request. Conversely, small file content includes content that can be rapidly satisfied and does not occupy server resources for an extended period of time. Small file content includes documents, text, and low resolution images as some examples. As a result, a server is able to satisfy significantly more small file content requests than large file content requests in the same period of time. Therefore to ensure a balanced load distribution across a PoP, requests should be differentiated on the basis of content type such that the servers of the PoP receive an equal amount of large file content requests and small file content requests.

To perform differentiated request distribution on the basis of content type and to ensure a balanced load distribution, some embodiments implement a layered consistent distribution scheme in which a first consistent distribution scheme is associated with distributing content of a first type (e.g., large file content) and a second consistent distribution scheme is associated with distribution content of a second type (e.g., small file content). The first tier distribution element performing the differentiated distribution is configured with the first and second consistent distribution schemes and also with a configuration for differentiating between the first and second types of content.

The configuration for differentiating between the content types can include a listing of file extensions that are to be distributed according to the first consistent distribution scheme with all other file extensions not in the listing to be distributed according to the second consistent distribution scheme. For instance, the listing can identify requests for videos or movies with the extensions *.mov, *.flv, *.avi, *.swf, *.mpg, and *.wmv as requests that should be distributed according to the first consistent distribution scheme. The configuration can be specified with any desired granularity, wherein the configuration can include names or URLs for specific content, specific domain names (e.g., youtube.com or netflix.com), or include an indexed lookup table in which a URL is used to index the table and identify whether the requested content exceeds a large file content threshold irrespective of the type of content being requested.

Using such a layered consistent distribution scheme, the first consistent distribution scheme ensures even distribution of requests of the first content type across a set of servers and the second consistent distribution scheme ensures even distribution of requests of the second content type across the set of servers. As a result, the load associated with the first content type and the second content type will be evenly distributed across the set of servers. Conversely, if a distribution scheme was used that did not differentiate between the content types being requested, it may be possible for one or more servers to receive a disproportionate share of requests for the first content type which can impose a disproportionate load on those servers than other servers receiving a disproportionate share of requests for the second content type.

FIG. 12 illustrates the potential of an overloaded server when distributing requests in a manner that does not differentiate on the basis of content type. FIG. 13 then illustrates how the potential for overload is avoided when distributing requests in a manner that differentiates on the basis of content type when using the layered consistent distribution scheme of some embodiments.

FIG. 12 depicts a first tier distribution element 1210 that distributes requests in an undifferentiated manner to two second tier caching elements 1220 and 1230. The distribution is illustrated by example of four content requests 1240, 1250, 1260, and 1270, wherein requests 1240 and 1250 are requests for different large file content and requests 1260 and 1270 are requests for different small file content. For exemplary purposes, it is assumed that satisfying either of the large file content requests 1240 and 1250 imposes three times the load on the caching element than if the caching element was to satisfy either of the small file content requests 1260 and 1270. Since the first tier distribution element 1210 does not differentiate between the types of content being requested, it is possible for the first tier distribution element 1210 to distribute both of the large file content requests 1240 and 1250 to the same second tier caching element 1220 and both of the small file content requests 1260 and 1270 to the same second tier caching element 1230. Consequently, the second tier caching element 1220 receiving both of the large file content requests 1240 and 1250 has a three times greater load than the second tier caching element 1230 receiving both of the small file content requests 1260 and 1270.

FIG. 13 depicts the same framework including first tier distribution element 1310, second tier caching elements 1320 and 1330, two requests for different large file content 1340 and 1350, and two requests for different small file content 1360 and 1370. However in FIG. 13, the first tier distribution 1310 performs a differentiated distribution of the content on the basis of content type according to the layered consistent distribution scheme of some embodiments. Accordingly, the first tier distribution element 1310 distributes the two large file content requests 1340 and 1350 using a first consistent distribution scheme such that those two requests are evenly distributed amongst the second tier caching elements 1320 and 1330 with each second tier caching element receiving one of the large file content requests. Similarly, the first tier distribution element 1310 distributes the two small file content requests 1360 and 1370 using a second consistent distribution scheme such that those two requests are evenly distributed amongst the second tier caching elements 1320 and 1330 with each second tier caching element receiving one of the small file content requests.

In comparison to the distribution achieved in FIG. 12 in which there was a three to one difference in load between the two caching elements, FIG. 13 achieves a distribution in which the load is equally distributed between the two caching elements. The two consistent distribution schemes also ensure that the load is preserved by consistently distributing subsequent requests for the same content to the same servers.

The layered consistent distribution scheme of some embodiments can also be adapted to allow for differentiation based on content provider origin. Such differentiation can be used within a CDN to provide differentiated quality of service for different content providers whose content is hosted by the CDN. For example, content providers that pay more can have their content hosted by more servers or faster more powerful servers than content providers that pay a reduced rate. By differentiating in this manner, the CDN prioritizes content delivery for the higher paying content providers, thereby providing a better experience for end users that consume the content of the higher paying content providers.

When providing differentiated distribution on the basis of content provider origin, the layered consistent distribution scheme is configured with a first consistent distribution scheme for prioritized content providers and a second consistent distribution scheme for other content providers. To provide the differentiated quality of service, the member hash of the first consistent distribution scheme can be configured to include the more powerful servers of a PoP while the member hash of the second consistent distribution scheme can be configured to include the less powerful servers of the PoP. Also or alternatively, the member hash of the first consistent distribution scheme can be configured to include more servers of the PoP than the member hash of the second consistent distribution scheme in order to provide a larger pool of resources for delivering the content of the prioritized content providers.

IV. Server System

Many of the above-described processes are implemented as software processes that are specified as a set of instructions recorded on non-transitory computer-readable storage medium (also referred to as computer readable medium). When these instructions are executed by one or more computational element(s) (such as processors or other computational elements like ASICs and FPGAs), they cause the computational element(s) to perform the actions indicated in the instructions. More specifically, when the instructions are executed, they transform a computer system with general computing resources into a specialized first tier distribution element performing any one or more of the 64-bit consistent distribution scheme, differentiated consistent distribution scheme, and layered consistent distribution scheme described with the embodiments presented herein.

Server, computer system, and computing machine are meant in their broadest sense and may include any electronic device with a processor that executes instructions stored on computer readable media or that are obtained remotely over a network connection. Examples of computer readable media include, but are not limited to, CD-ROMs, flash drives, RAM chips, hard drives, EPROMs, etc. Further, wherever a server is identified as a component of the embodied invention, it is understood that the server may be a single physical machine, or a cluster of multiple physical machines performing related functions, or virtualized servers co-resident on a single physical machine, or various combinations of the above.

Figure 14:
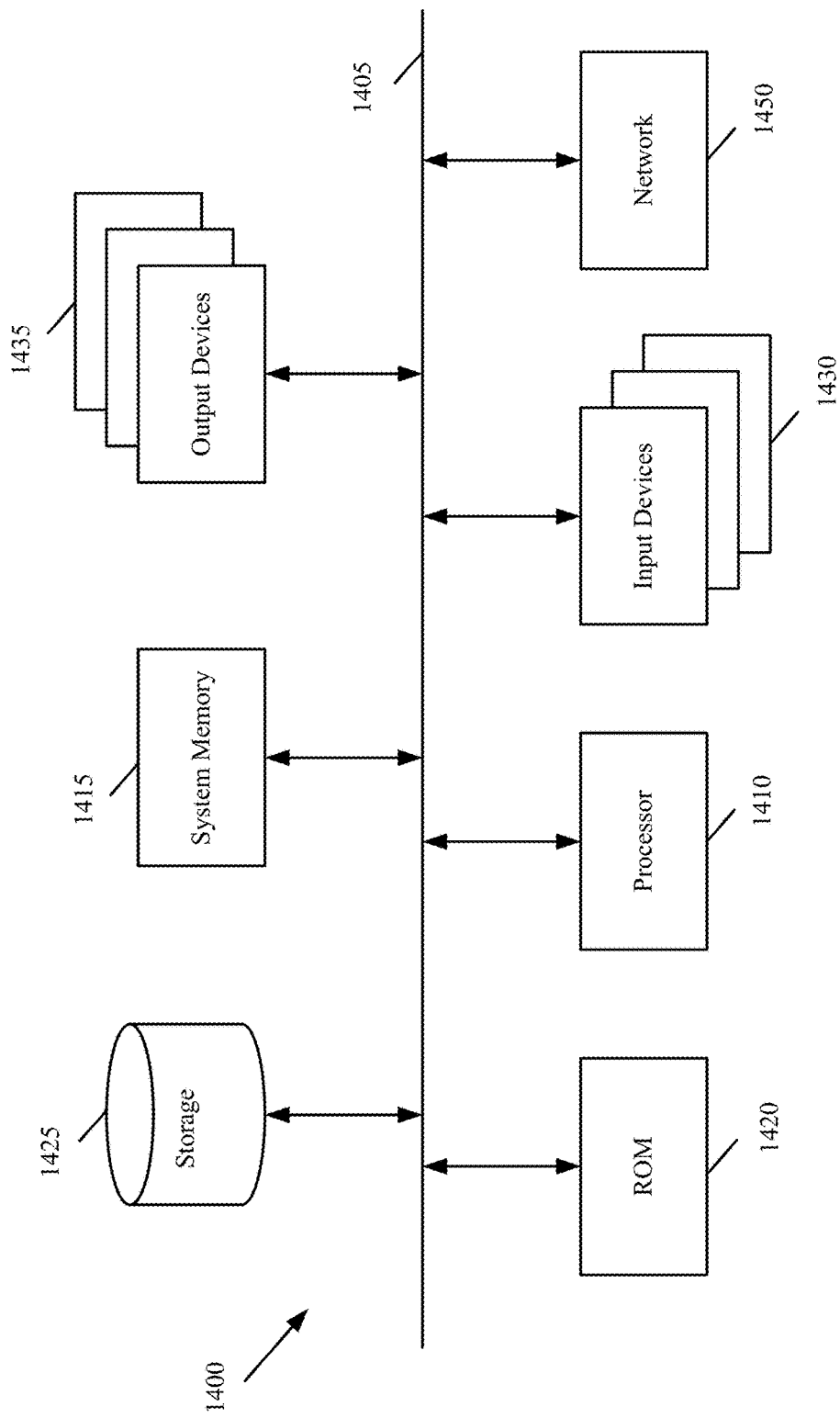
FIG. 14 illustrates a computer system or server with which some embodiments are implemented.

FIG. 14 illustrates a computer system or server with which some embodiments are implemented. Such a computer system includes various types of computer readable mediums and interfaces for various other types of computer-readable mediums that implement the processes for the cache validation systems and methods described above (e.g., first tier CDN edge server and gateway server). Computer system 1400 includes a bus 1405, a processor 1410, a system memory 1415, a read-only memory 1420, a permanent storage device 1425, input devices 1430, and output devices 1435.

The bus 1405 collectively represents all system, peripheral, and chipset buses that communicatively connect the numerous internal devices of the computer system 1400. For instance, the bus 1405 communicatively connects the processor 1410 with the read-only memory 1420, the system memory 1415, and the permanent storage device 1425. From these various memory units, the processor 1410 retrieves instructions to execute and data to process in order to execute the processes of the invention. The processor 1410 is a processing device such as a central processing unit, integrated circuit, graphical processing unit, etc.

The read-only-memory (ROM) 1420 stores static data and instructions that are needed by the processor 1410 and other modules of the computer system. The permanent storage device 1425, on the other hand, is a read-and-write memory device. This device is a non-volatile memory unit that stores instructions and data even when the computer system 1400 is off. Some embodiments of the invention use a mass-storage device (such as a magnetic or optical disk and its corresponding disk drive) as the permanent storage device 1425.

Other embodiments use a removable storage device (such as a flash drive) as the permanent storage device Like the permanent storage device 1425, the system memory 1415 is a read-and-write memory device. However, unlike the storage device 1425, the system memory is a volatile read-and-write memory, such as random access memory (RAM). The system memory stores some of the instructions and data that the processor needs at runtime. In some embodiments, the processes are stored in the system memory 1415, the permanent storage device 1425, and/or the read-only memory 1420.

The bus 1405 also connects to the input and output devices 1430 and 1435. The input devices enable the user to communicate information and select commands to the computer system. The input devices 1430 include, but are not limited to, alphanumeric keypads (including physical keyboards and touchscreen keyboards) and pointing devices (also called "cursor control devices"). The input devices 1430 also include audio input devices (e.g., microphones, MIDI musical instruments, etc.). The output devices 1435 display images generated by the computer system. The output devices include, but are not limited to, printers and display devices, such as cathode ray tubes (CRT) or liquid crystal displays (LCD).

Finally, as shown in FIG. 14, bus 1405 also couples computer 1400 to a network 1450 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 1400 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method comprising:
   receiving a plurality of requests over the Internet at a load distribution server allocating the plurality of requests across a plurality of distribution servers, the plurality of requests comprising a first set of requests directed to a first content type and a second set of requests directed to at least a different second content type, the load distribution server comprising a processor and memory storing an identifier identifying each server of the plurality of distribution servers, the processor:
      producing a hash result for each server of the plurality of distribution servers, wherein said producing comprises hashing the identifier identifying each server of the plurality of distribution servers;
      selecting a first load factor value for the first set of requests based on the first content type of the first set of requests, and a different second load factor value for the second set of requests based on the second content type of the second set of requests;
      distributing the first set of requests across a first set of the plurality of distribution servers by adjusting the hash result produced for each server of the first set of distribution servers with the first load factor value and by selecting a server from the first set of distribution servers to receive each request from the first set of requests based on the hash result of each server of the first set of distribution servers as adjusted by the first load factor value, the first load factor value increasing selection precedence of any server of the first set of distribution servers over a different second set of the plurality of distribution servers; and
      distributing the second set of requests across the second set of distribution servers by adjusting the hash result produced for the second set of distribution servers with the second load factor value and by selecting a server from the second set of distribution servers to receive each request from the second set of requests based on the hash result of each server of the second set of distribution servers as adjusted by the second load factor value, the second load factor value increasing selection precedence of any server of the second set of distribution servers over the first set of distribution servers.

2. The method of claim 1, the processor further producing a second hash result by hashing a Uniform Resource Locator (URL) of each request of the plurality of requests.

3. The method of claim 2, wherein selecting a server from the first set of distribution servers is further based on combining the second hash result with the hash result produced for each server of the first set of distribution servers as adjusted by the first load factor value.

4. The method of claim 1, wherein the hash result is a 64-bit value produced from a 64-bit hash of the identifier identifying a server of the plurality of distribution servers.

5. The method of claim 1, wherein the first content type comprises cacheable content and the second content type comprises content that is not cacheable.

6. The method of claim 1, wherein the first content type comprises content that is requested more than a specified threshold during a time duration and the second content type comprises content that is not requested more than the specific threshold during the time duration.

7. The method of claim 1, wherein the first content type comprises content with a first set of file extensions and the second content type comprises content with a different second set of file extensions.

8. The method of claim 1, wherein the first content type comprises content with high quality of service and the second content type comprises content with low quality of service.

9. The method of claim 1, wherein the processor further differentiates the first set of requests from the second set of requests based on a URL, domain name, file extension, or Internet Protocol (IP) address associated with each request of the plurality of requests.

10. A computer-implemented method comprising:
    receiving a plurality of requests over the Internet at a first tier server controlling distribution of the plurality of requests across a set of second tier servers, the first tier server comprising a processor and memory storing a threshold for differentiating hot content from regular content, the processor leveraging the memory in:
       monitoring request rates for different content requested in the plurality of requests;
       distributing a first set of the plurality of requests from the first tier server across the set of second tier servers according to a first consistent distribution scheme, the first set of requests comprising an intermixing of requests requesting at least first content, second content, and third content, and wherein said distributing according to the first consistent distribution scheme comprises sending requests for the first content to a first server of the set of second tier servers, requests for the second content to a second server of the set of second tier servers, and requests for the third content to a third server of the set of second tier servers;
       classifying the first content as hot content in response to a request rate of the first content exceeding the threshold, and the second content and the third content as regular content in response to request rates of the second content and the third content not exceeding the threshold; and distributing a second set of the plurality of requests directed to the first content from the first tier server across the first server and the second server according to a second consistent distribution scheme, and a third set of the plurality of requests directed to the second content or the third content from the first tier server to at least the third server according to a third consistent distribution scheme, wherein the second distribution scheme is based on results of the first distribution scheme adjusted by a first load factor value that prioritizes selection of the first server and the second server and deprioritizes selection of the third server, and wherein the third distribution scheme is based on the results of the first distribution scheme adjusted by a second load factor value that prioritizes selection of at least the third server and deprioritizes selection of the first server and the second server.

11. The computer-implemented method of claim 10 further comprising allocating additional server resources to serve the first content by producing the second consistent distribution scheme and the third consistent distribution scheme from the first distribution scheme, the second consistent distribution scheme selecting the first server or the second server for delivery of the first content and the third consistent distribution scheme selecting at least the third server for delivery of the second content and the third content.

12. The computer-implemented method of claim 10, wherein distributing the first set of requests according to the first consistent distribution scheme comprises hashing different identifiers identifying the first server, the second server, and the third server, and selecting one of the first, second, and third servers to receive a request based on results of said hashing.

13. The computer-implemented method of claim 12, wherein distributing the second set of requests according to the second consistent distribution scheme comprises adjusting results of said hashing using the first load factor value.

14. The computer-implemented method of claim 13, wherein distributing the third set of requests according to the third consistent distribution scheme comprises adjusting results of said hashing using the second load factor value.

15. The computer-implemented method of claim 10 further comprising advertising an IP address from the first tier server identifying the first tier server as a source for any content served by the set of second tier servers.

16. A method comprising:
    distributing a first set of requests from a load distribution server across a plurality of servers;
    identifying a first content type from a plurality of content types requested in the first set of requests creating an unbalanced load across the plurality of servers;
    receiving over the Internet at the load distribution server, a second set of requests directed to the first content type and a third set of requests directed to other content types from the plurality of content types; and
    dynamically differentiating a first set of the plurality of servers for distribution of the first content type and a different second set of the plurality of servers for distribution of the other content types, wherein dynamically differentiating comprises:
    (i) producing a hash result for each server of the plurality of servers by hashing an identifier identifying each server of the plurality of servers,
    (ii) adjusting, in response to a request from the second set of requests directed to the first content type, the hash result produced for each server of the first set of servers based on a first value associated with the first content type, wherein the hash result produced for each server remains unchanged in response to a request from the third set of requests directed to other content types,
    (iii) distributing the second set of requests across the first set of servers based on the hash results adjusted with the first value, and
    (iv) distributing the third set of requests across the second set of servers based on the hash results without said adjusting.

17. The method of claim 16, wherein dynamically differentiating further comprises temporarily allocating the first set of servers for exclusive distribution of content of the first content type.

18. The method of claim 16, wherein content of the first content type imposes greater load on a server than content of the other content types.

* * * * *